(12) United States Patent
El-Mokadem et al.

(10) Patent No.: US 12,505,620 B2
(45) Date of Patent: Dec. 23, 2025

(54) SYSTEMS AND METHODS FOR INTELLIGENTLY CONFIGURING AND DEPLOYING A MODEL ORCHESTRATOR MESH OF A MACHINE LEARNING-BASED DIALOGUE SYSTEM USING A GRAPHICAL USER INTERFACE

(71) Applicant: Clinc, Inc., Ann Arbor, MI (US)

(72) Inventors: Jamal El-Mokadem, Farmington Hills, MI (US); Connor Witt, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 19/216,393

(22) Filed: May 22, 2025

(65) Prior Publication Data
US 2025/0363743 A1   Nov. 27, 2025

Related U.S. Application Data

(60) Provisional application No. 63/809,624, filed on May 21, 2025, provisional application No. 63/651,683, filed on May 24, 2024.

(51) Int. Cl.
*G06T 17/20* (2006.01)
*G06F 3/04815* (2022.01)
*G06F 3/0482* (2013.01)

(52) U.S. Cl.
CPC .......... *G06T 17/20* (2013.01); *G06F 3/04815* (2013.01); *G06F 3/0482* (2013.01)

(58) Field of Classification Search
CPC ... G06T 17/20; G06F 3/04815; G06F 3/0482; G06F 40/35; H04L 51/02; H04L 51/216
See application file for complete search history.

(56) References Cited

U.S. PATENT DOCUMENTS

| | | | |
|---|---|---|---|
| 11,934,794 B1* | 3/2024 | Hill | G06F 40/35 |
| 2019/0122409 A1* | 4/2019 | Meadows | G06N 3/094 |
| 2020/0193265 A1* | 6/2020 | Hill | G06F 40/30 |
| 2020/0286463 A1* | 9/2020 | Galitsky | G06F 16/35 |

* cited by examiner

*Primary Examiner* — Abderrahim Merouan
(74) *Attorney, Agent, or Firm* — Padowithz Alce; Chandler Scheitlin; Alce PLLC

(57) ABSTRACT

A system, method, and computer-program product includes instantiating a user interface (UI) that provides a user with a graphical environment for creating a model orchestration mesh controlling an operation of a plurality of disparate AI dialogue models, automatically installing, within the graphical environment of the UI, a root socket node, digitally assigning a first disparate AI dialogue model of the plurality of disparate AI dialogue models to the root socket node, automatically generating, within the graphical environment of the UI, a plurality of distinct mesh socket nodes, receiving, via the UI, an input from the user selecting a graphical UI control element displayed on the UI that, when selected, changes a state of the UI to an interactive gesture-based tracking state, constructing, within the graphical environment of the UI, a plurality of graphical socket transitions while the UI is in the interactive gesture-based tracking state.

20 Claims, 13 Drawing Sheets

200

Configuring one or more Mesh Sockets of an Orchestrator Mesh S210

Configuring one or more Egress State Nodes and one or more Ingress State Nodes S220

Configuring one or more Socket Transitions based on the one or more Egress State Nodes and the one or more Ingress State Nodes S230

Deploying the Orchestrator Mesh in an Automated Dialogue System S240

FIGURE 2

SYSTEMS AND METHODS FOR INTELLIGENTLY CONFIGURING AND DEPLOYING A MODEL ORCHESTRATOR MESH OF A MACHINE LEARNING-BASED DIALOGUE SYSTEM USING A GRAPHICAL USER INTERFACE

CROSS-REFERENCE TO RELATED APPLICATIONS

This application claims the benefit of U.S. Provisional Application No. 63/651,683, filed 24 May 2024 and U.S. Provisional Application No. 63/809,624, filed 21 May 2025, which are incorporated in their entireties by this reference.

GOVERNMENT RIGHTS

The subject matter of the invention may be subject to U.S. Government Rights under National Science Foundation grants: NSF SBIR Phase 1 Grant-1622049 and NSF SBIR Phase 2 Grant-1738441.

TECHNICAL FIELD

The inventions herein relate generally to the machine learning and artificially intelligent dialogue systems fields, and more specifically to a new and useful system and method for configuring and deploying an orchestrator mesh control structure of a machine learning-based dialogue service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for categorizing user input and generating responses to users may not fully satisfy queries and commands posed by a user for which there are no predetermined rules to provide a meaningful response or result to the user.

Therefore, there is a need in the machine learning field and virtual dialogue service fields for systems and methods that enable intelligent techniques for categorizing unstructured data to structured categories of a machine learning-based dialogue service. The embodiments of the present application described herein provide technical solutions that address, at least, the need described above, as well as the deficiencies of the state of the art described throughout the present application.

BRIEF SUMMARY OF THE EMBODIMENTS

In one embodiment, a computer-implemented method for controlling a virtual dialogue agent that uses a plurality of disparate artificial intelligence (AI) dialogue models includes instantiating, by one or more computer processors, a mesh configuration user interface (UI) that provides a user with a graphical environment for creating a model orchestration mesh controlling an operation of the plurality of disparate AI dialogue models associated with the virtual dialogue agent; in response to instantiating the mesh configuration UI, automatically installing, within the graphical environment of the mesh configuration UI, a root socket node that functions as an entry point for input data into the model orchestration mesh; digitally assigning, by the one or more computer processors, a first disparate AI dialogue model of the plurality of disparate AI dialogue models to the root socket node in response to receiving, via the mesh configuration UI, a request from the user to digitally pair the first disparate AI dialogue model to the root socket node; automatically generating in real-time, within the graphical environment of the mesh configuration UI, a plurality of distinct mesh socket nodes based on receiving a plurality of user inputs operating a mesh socket creation button displayed on the mesh configuration UI, wherein: each distinct mesh socket node of the plurality of distinct mesh socket nodes comprises an operational proxy of a distinct one of the plurality of disparate AI dialogue models; receiving, via the mesh configuration UI, an input from the user selecting a graphical UI control element displayed on the mesh configuration UI that, when selected, changes a state of the mesh configuration UI to an interactive gesture-based tracking state; while the mesh configuration UI is in the interactive gesture-based tracking state: constructing, within the graphical environment of the mesh configuration UI, a plurality of graphical socket transitions that (i) connect the root socket node to at least a subset of the plurality of distinct mesh socket nodes and (ii) connect target pairs of mesh socket nodes of the plurality of distinct mesh socket nodes together, thereby enabling dialogue data packets to be transferred between the root socket node and the plurality of distinct mesh socket nodes as enforced by the plurality of graphical socket transitions; and enabling, by the one or more computer processors, a runtime deployment of the model orchestration mesh in a production environment to control the virtual dialogue agent that uses the plurality of disparate AI dialogue models based at least on the creation of the model orchestration mesh.

In one embodiment, the interactive gesture-based tracking state enables the user to construct a respective graphical socket transition of the plurality of graphical socket transitions by performing a continuous sequence of inputs comprising: (i) selecting, using a mouse cursor, a visual representation of the root socket node displayed on the mesh configuration UI, wherein selecting the visual representation of the root socket node designates the root socket node as an egress socket node, (ii) navigating, while the visual representation of the root socket node is selected, to a visual representation that corresponds to one of the plurality of distinct mesh socket nodes displayed on the mesh configuration UI, and (iii) releasing the mouse cursor over the visual representation that corresponds to the one of the plurality of distinct mesh socket nodes, wherein: the release of the mouse cursor over the visual representation that corresponds to the one of the plurality of distinct mesh socket nodes designates the one of the plurality of distinct mesh socket nodes as an ingress socket node, and the respective graphical socket transition is created between the egress socket node and the ingress socket node in response to the continuous sequence of inputs being performed during the interactive gesture-based tracking state.

In one embodiment, the root socket node comprises an operational proxy to the first disparate AI dialogue model, wherein the first disparate AI dialogue model includes a plurality of distinct dialogue state nodes associated with a first dialogue competency, the one of the plurality of distinct mesh socket nodes comprises the operational proxy to a second disparate AI dialogue model of the plurality of disparate AI dialogue models, wherein the second disparate AI dialogue model includes a plurality of distinct dialogue state nodes associated with a second dialogue competency, the computer-implemented method further includes: automatically instantiating, by the one or more computer processors, a socket transition popover in response to detecting the release of the mouse cursor over the visual representation that corresponds to the one of the plurality of distinct mesh socket nodes, wherein the socket transition popover includes: a socket transition type UI element that, when selected, displays a dropdown menu element of a plurality of distinct socket transition types available to the user, an egress dialogue state UI element that, when selected, displays a dropdown menu element of the plurality of distinct dialogue state nodes corresponding to the first disparate AI dialogue model, and an ingress dialogue state UI element that, when selected, displays a dropdown menu element of the plurality of distinct dialogue state nodes corresponding to the second disparate AI dialogue model.

In one embodiment, the computer-implemented method further includes while displaying the socket transition popover: receiving, at the socket transition type UI element, a user input selecting a target socket transition type from the dropdown menu element of the plurality of distinct socket transition types, receiving, at the egress dialogue state UI element, a user input selecting a target dialogue state node included in the dropdown menu element of the plurality of distinct dialogue state nodes corresponding to the first disparate AI dialogue model, receiving, at the ingress dialogue state UI element, a user input selecting a subject dialogue state node included in the dropdown menu element of the plurality of distinct dialogue state nodes corresponding to the second disparate AI dialogue model, wherein the respective graphical socket transition is further created or encoded based on (i) the target socket transition type selected at the socket transition type UI element, (ii) the target dialogue state node selected at the egress dialogue state UI element, and (iii) the subject dialogue state node selected at the ingress dialogue state UI element.

In one embodiment, the computer-implemented method further includes receiving, from the user, an input selecting the root socket node displayed within the graphical environment of the mesh configuration UI, instantiating, by the one or more computer processors, an AI assignment popover overlaid on the mesh configuration UI in response to receiving the input selecting the root socket node, wherein the AI assignment popover includes: an AI model UI element that, when selected, displays a dropdown menu element of the plurality of disparate AI dialogue models; displaying, within the AI assignment popover, the dropdown menu element of the plurality of disparate AI dialogue models in response to receiving an input from the user selecting the AI model UI element; and receiving, while displaying the dropdown menu element of the plurality of disparate AI dialogue models, a selection of a menu item included in the dropdown menu element of the plurality of disparate AI dialogue models that corresponds to the first disparate AI dialogue model, wherein: the first disparate AI dialogue model is digitally assigned to the root socket node in response to receiving the selection of the menu item included in the dropdown menu element of the plurality of disparate AI dialogue models that corresponds to the first disparate AI dialogue model.

In one embodiment, automatically generating the plurality of distinct mesh socket nodes within the graphical environment of the mesh configuration UI includes generating a first distinct mesh socket node that comprises the operational proxy to a second disparate AI dialogue model of the plurality of disparate AI dialogue models, and a second distinct mesh socket node that comprises the operational proxy to a third disparate AI dialogue model of the plurality of disparate AI dialogue models.

In one embodiment, the computer-implemented method further includes in response to receiving a first user input of the plurality of user inputs that operates the mesh socket creation button displayed on the mesh configuration UI, instantiating, by the one or more computer processors, a socket AI assignment popover overlaid on the mesh configuration UI, wherein the socket AI assignment popover includes: an AI model UI element that, when selected, displays a dropdown menu element of the plurality of disparate AI dialogue models; displaying, within the socket AI assignment popover, the dropdown menu element of the plurality of disparate AI dialogue models in response to receiving an input from the user selecting the AI model UI element; receiving, while displaying the dropdown menu element of the plurality of disparate AI dialogue models, a selection of a menu item included in the dropdown menu element of the plurality of disparate AI dialogue models that corresponds to the second disparate AI dialogue model, wherein: the first distinct mesh socket node is automatically generated within the graphical environment of the mesh configuration UI in response to receiving an input from the user selecting a socket generation button displayed on the socket AI assignment popover while the menu item corresponding to the second disparate AI dialogue model is selected.

In one embodiment, the computer-implemented method further includes in response to receiving a second user input of the plurality of user inputs that operates the mesh socket creation button displayed on the mesh configuration UI, instantiating, by the one or more computer processors, the socket AI assignment popover overlaid on the mesh configuration UI; displaying, within the socket AI assignment popover, the dropdown menu element of the plurality of disparate AI dialogue models in response to receiving a subsequent input from the user selecting the AI model UI element; receiving, while displaying the dropdown menu element of the plurality of disparate AI dialogue models, a selection of a menu item included in the dropdown menu element of the plurality of disparate AI dialogue models that corresponds to the third disparate AI dialogue model, wherein: the second distinct mesh socket node is automatically generated within the graphical environment of the mesh configuration UI in response to receiving a further subsequent input from the user selecting the socket generation button displayed on the socket AI assignment popover while the menu item corresponding to the third disparate AI dialogue model is selected.

In one embodiment, the computer-implemented method further includes in response to the virtual dialogue agent receiving one or more natural language inputs from an entity, the model orchestration mesh is executed to selectively invoke one or more of the plurality of disparate AI dialogue models during a multi-turn conversation with the entity to respond to the one or more natural language inputs.

In one embodiment, the one or more natural language inputs received by the virtual dialogue agent correspond to a plurality of distinct dialogue competencies, each disparate AI dialogue model of the plurality of disparate AI dialogue models is configured to handle a distinct dialogue competency of the plurality of distinct dialogue competencies, each disparate AI dialogue model of the plurality of disparate AI dialogue models includes a respective automated dialogue control system structure comprising a respective set of dialogue state nodes and a respective set of dialogue state transitions for handling user queries related to the distinct dialogue competency; and the model orchestration mesh created using the mesh configuration UI combines the plurality of disparate AI dialogue models into a single composite AI dialogue model that enables the virtual dialogue agent to handle the multi-turn conversation spanning across multiple distinct dialogue competencies.

In one embodiment, a computer-implemented system for controlling a virtual dialogue agent that uses a plurality of disparate artificial intelligence (AI) dialogue models includes one or more computer processors; a memory; a computer-readable medium operably coupled to the one or more computer processors, the computer-readable medium having computer-readable instructions stored thereon that, when executed by the one or more computer processors, cause a computing device to perform operations comprising: instantiating, by the one or more computer processors, a mesh configuration user interface (UI) that provides a user with a graphical environment for creating a model orchestration mesh controlling an operation of the plurality of disparate AI dialogue models associated with the virtual dialogue agent; in response to instantiating the mesh configuration UI, automatically installing, within the graphical environment of the mesh configuration UI, a root socket node that functions as an entry point for input data into the model orchestration mesh; digitally assigning, by the one or more computer processors, a first disparate AI dialogue model of the plurality of disparate AI dialogue models to the root socket node in response to receiving, via the mesh configuration UI, a request from the user to digitally pair the first disparate AI dialogue model to the root socket node; automatically generating in real-time, within the graphical environment of the mesh configuration UI, a plurality of distinct mesh socket nodes based on receiving a plurality of user inputs operating a mesh socket creation button displayed on the mesh configuration UI, wherein: each distinct mesh socket node of the plurality of distinct mesh socket nodes comprises an operational proxy to a distinct one of the plurality of disparate AI dialogue models; receiving, via the mesh configuration UI, an input from the user selecting a graphical UI control element displayed on the mesh configuration UI that, when selected, changes a state of the mesh configuration UI to an interactive gesture-based tracking state; while the mesh configuration UI is in the interactive gesture-based tracking state: constructing, within the graphical environment of the mesh configuration UI, a plurality of graphical socket transitions that (i) connect the root socket node to at least a subset of the plurality of distinct mesh socket nodes and (ii) connect target pairs of mesh socket nodes of the plurality of distinct mesh socket nodes together, thereby enabling dialogue data packets to be transferred between the root socket node and the plurality of distinct mesh socket nodes as enforced by the plurality of graphical socket transitions; and enabling, by the one or more computer processors, a runtime deployment of the model orchestration mesh in a production environment to control the virtual dialogue agent that uses the plurality of disparate AI dialogue models based at least on the creation of the model orchestration mesh, wherein: in response to the virtual dialogue agent receiving one or more natural language inputs from an entity, the model orchestration mesh is executed to selectively invoke one or more of the plurality of disparate AI dialogue models during a multi-turn conversation with the entity to respond to the one or more natural language inputs.

In one embodiment, the first disparate AI dialogue model of the plurality of disparate AI dialogue models is configured to handle any natural language input provided to the virtual dialogue agent that corresponds to a first distinct dialogue competency, automatically generating the plurality of distinct mesh socket nodes within the graphical environment of the mesh configuration UI includes: generating a first distinct mesh socket node that comprises the operational proxy to a second disparate AI dialogue model of the plurality of disparate AI dialogue models, wherein the second disparate AI dialogue model is configured to handle any natural language input provided to the virtual dialogue agent that corresponds to a second distinct dialogue competency, and generating a second distinct mesh socket node that comprises the operational proxy to a third disparate AI dialogue model of the plurality of disparate AI dialogue models, wherein the third disparate AI dialogue model is configured to handle any natural language input provided to the virtual dialogue agent that corresponds to a third distinct dialogue competency.

In one embodiment, a first natural language input of the one or more natural language inputs received by the virtual dialogue agent corresponds to the third distinct dialogue competency, the model orchestration mesh automatically routes the first natural language input that corresponds to the third distinct dialogue competency to the second distinct mesh socket node as the third disparate AI dialogue model is operably configured to handle the third distinct dialogue competency, the model orchestration mesh invokes the third disparate AI dialogue model to generate a response to the first natural language input in response to routing the first natural language input to the third disparate AI dialogue model, the model orchestration mesh does not route the first natural language input that corresponds to the third distinct dialogue competency to the first distinct mesh socket node as the second disparate AI dialogue model is not operably configured to handle the third distinct dialogue competency, and the model orchestration mesh does not invoke the second disparate AI dialogue model to respond to the first natural language input.

In one embodiment, a second natural language input of the one or more natural language inputs received by the virtual dialogue agent corresponds to the second distinct dialogue competency, the virtual dialogue agent invokes the second disparate AI dialogue model to respond to the second natural language input as the second disparate AI dialogue model is operably configured to handle the second distinct dialogue competency, and the virtual dialogue agent does not invoke the third disparate AI dialogue model to respond to the second natural language input as the third disparate AI dialogue model is not operably configured to handle the second distinct dialogue competency.

In one embodiment, a first mesh socket node of the plurality of distinct mesh socket nodes comprises the operational proxy to a second disparate AI dialogue model of the plurality of disparate AI dialogue models and includes a socket-level memory store, the socket-level memory store is configured to store one or more dialogue slots generated or extracted by the second disparate AI dialogue model in response to the one or more natural language inputs, a second mesh socket node of the plurality of distinct mesh socket nodes comprises the operational proxy to a third disparate AI dialogue model of the plurality of disparate AI dialogue models and is configured to read the one or more dialogue slots stored in the socket-level memory store of the first mesh socket node, and the computer-readable instructions, when executed by the one or more computer processors, cause the computing device to perform further operations comprising providing the one or more dialogue slots read from the socket-level memory store of the first mesh socket node to the third disparate AI dialogue model during a subject socket transition between the first mesh socket node and the second mesh socket node, and generating a natural language response to the one or more natural language inputs based on the third disparate AI dialogue model assessing the one or more natural language inputs in combination with the one or more dialogue slots.

In one embodiment, the computer-readable instructions, when executed by the one or more computer processors, cause the computing device to perform further operations comprising: training, by the one or more computer processors, a machine learning-based mesh classification model using a plurality of labeled utterances, wherein: each labeled utterance of the plurality of labeled utterances corresponds to a dialogue intent associated with a subject graphical socket transition within the model orchestration mesh, and the machine learning-based mesh classification model is executed to compute an intent classification prediction that corresponds to a respective natural language input of the one or more natural language inputs received by the virtual dialogue agent, and the model orchestration mesh executes a respective graphical socket transition of the plurality of graphical socket transitions that matches the intent classification prediction associated with the respective natural language input.

In one embodiment, a computer-program product comprising in a non-transitory machine-readable storage medium storing computer instructions that, when executed by one or more computer processors, perform operations comprising: instantiating, by the one or more computer processors, a mesh configuration user interface (UI) that provides a user with a graphical environment for creating a model orchestration mesh that controls an operation of a virtual dialogue agent and a plurality of disparate AI dialogue models associated with the virtual dialogue agent; in response to instantiating the mesh configuration UI, automatically installing, within the graphical environment of the mesh configuration UI, a root socket node that functions as an entry point for input data into the model orchestration mesh; digitally assigning, by the one or more computer processors, a first disparate AI dialogue model of the plurality of disparate AI dialogue models to the root socket node in response to receiving, via the mesh configuration UI, a request from the user to digitally pair the first disparate AI dialogue model with the root socket node; automatically generating in real-time, within the graphical environment of the mesh configuration UI, a plurality of distinct mesh socket nodes based on receiving a plurality of user inputs selecting a mesh socket creation button displayed on the mesh configuration UI, wherein: each distinct mesh socket node of the plurality of distinct mesh socket nodes is coupled to a distinct one of the plurality of disparate AI dialogue models; constructing, within the graphical environment of the mesh configuration UI, a plurality of graphical socket transitions that (i) connect the root socket node to at least a subset of the plurality of distinct mesh socket nodes and (ii) connect target pairs of mesh socket nodes of the plurality of distinct mesh socket nodes together, thereby enabling the virtual dialogue agent to operate across the plurality of disparate AI dialogue models via the model orchestration mesh; and deploying, via the one or more computer processors, the model orchestration mesh into a production environment to control the virtual dialogue agent, wherein: in response to the virtual dialogue agent receiving one or more natural language inputs from an entity, the model orchestration mesh is executed to selectively invoke one or more of the plurality of disparate AI dialogue models during a multi-turn conversation with the entity to respond to the one or more natural language inputs.

In one embodiment, automatically generating the plurality of distinct mesh socket nodes within the graphical environment of the mesh configuration UI includes generating a first distinct mesh socket node that functions as a proxy to a second disparate AI dialogue model of the plurality of disparate AI dialogue models, and a second distinct mesh socket node that functions as a proxy to a third disparate AI dialogue model of the plurality of disparate AI dialogue models.

In one embodiment, constructing, within the graphical environment of the mesh configuration UI, the plurality of graphical socket transitions includes constructing a first graphical socket transition, wherein constructing the first graphical socket transition includes: receiving, via the mesh configuration UI, an input from the user selecting an add socket transition button displayed on the mesh configuration UI; transitioning, in response to receiving the input selecting the add socket transition button, the mesh configuration UI into a socket transition creation mode that allows the user to construct the first graphical socket transition via a drag-and-drop operation; detecting, by the one or more computer processors, the drag-and-drop operation that connects the root socket node to the first distinct mesh socket node; and instantiating, by the one or more computer processors, a create orchestration transition popover overlaid on the mesh configuration UI in response to detecting the drag-and-drop operation, wherein the create orchestration transition popover includes: a socket transition type UI element that, when selected, displays a dropdown menu element of a plurality of distinct socket transition types available to the user, a source state UI element that, when selected, displays a dropdown menu element of a first plurality of distinct dialogue states nodes included in the first disparate AI dialogue model associated with the root socket node, a destination state UI element that, when selected, displays a dropdown menu element of a second plurality of distinct dialogue states nodes included in the second disparate AI dialogue model associated with the first distinct mesh socket node; receiving, at the socket transition type UI element, a user input selecting a target socket transition type from the dropdown menu element of the plurality of distinct socket transition types, receiving, at the source state UI element, a user input selecting a target dialogue state node included in the dropdown menu element of the first plurality of distinct dialogue states nodes, and receiving, at the destination state UI element, a user input selecting a subject dialogue state node included in the dropdown menu element of the second plurality of distinct dialogue states nodes, wherein the first graphical socket transition is created between the root socket node and the first distinct mesh socket node based on (i) the target socket transition type selected at the socket transition type UI element, (ii) the target dialogue state node selected at the source state UI element, and (iii) the subject dialogue state node selected at the destination state UI element.

In one embodiment, constructing, within the graphical environment of the mesh configuration UI, the plurality of graphical socket transitions includes constructing a second graphical socket transition, wherein constructing the second graphical socket transition includes: receiving, via the mesh configuration UI, an input from the user selecting an add socket transition button displayed on the mesh configuration UI; transitioning, in response to receiving the input selecting the add socket transition button, the mesh configuration UI into a socket transition creation mode that allows the user to construct the second graphical socket transition via a drag-and-drop operation; detecting, by the one or more computer processors, the drag-and-drop operation that starts at the first distinct mesh socket node and ends at the second distinct mesh socket node; and instantiating, by the one or more computer processors, a create orchestration transition popover overlaid on the mesh configuration UI in response to detecting the drag-and-drop operation, wherein the create orchestration transition popover includes a socket transition type UI element that, when selected, displays a dropdown menu element of a plurality of distinct socket transition types available to the user, a source state UI element that, when selected, displays a dropdown menu element of a first plurality of distinct dialogue states nodes included in the second disparate AI dialogue model associated with the first distinct mesh socket node, a destination state UI element that, when selected, displays a dropdown menu element of a second plurality of distinct dialogue states nodes included in the third disparate AI dialogue model associated with the second distinct mesh socket node, receiving, at the socket transition type UI element, a user input selecting a target socket transition type from the dropdown menu element of the plurality of distinct socket transition types, receiving, at the source state UI element, a user input selecting a target dialogue state node included in the dropdown menu element of the first plurality of distinct dialogue states nodes, and receiving, at the destination state UI element, a user input selecting a subject dialogue state node included in the dropdown menu element of the second plurality of distinct dialogue states nodes, wherein the second graphical socket transition is created between the first distinct mesh socket node and the second distinct mesh socket node based on (i) the target socket transition type selected at the socket transition type UI element, (ii) the target dialogue state node selected at the source state UI element, and (iii) the subject dialogue state node selected at the destination state UI element.

In one embodiment, a computer-implemented method for controlling a virtual dialogue agent that uses a plurality of disparate artificial intelligence (AI) dialogue models includes instantiating, by one or more computer processors, a mesh configuration user interface that provides a user with a graphical environment for creating a bot orchestration mesh that controls a use of the virtual dialogue agent and the plurality of disparate AI dialogue models underpinning the virtual dialogue agent; automatically constructing, within the graphical environment of the mesh configuration user interface, a root socket node that functions as an entry point for the bot orchestration mesh in response to instantiating the mesh configuration user interface; digitally assigning, by the one or more computer processors, a first disparate AI dialogue model of the plurality of disparate AI dialogue models to the root socket node in response to receiving, via the mesh configuration user interface, a request from the user to digitally pair the first disparate AI dialogue model with the root socket node; automatically generating, within the graphical environment of the mesh configuration user interface, a plurality of distinct mesh socket nodes based on receiving a plurality of user inputs selecting a mesh socket creation button displayed on the mesh configuration user interface, wherein: each distinct mesh socket node of the plurality of distinct mesh socket nodes is coupled to a distinct one of the plurality of disparate AI dialogue models; constructing, within the graphical environment of the mesh configuration user interface, a plurality of graphical socket transitions that (i) connect the root socket node to at least a subset of the plurality of distinct mesh socket nodes and (ii) connect target pairs of mesh socket nodes of the plurality of distinct mesh socket nodes together, thereby enabling the virtual dialogue agent to operate across the plurality of disparate AI dialogue models via the bot orchestration mesh; and deploying, via the one or more computer processors, the bot orchestration mesh into a production environment to control the virtual dialogue agent, wherein: in response to the virtual dialogue agent receiving one or more natural language inputs from an entity, the bot orchestration mesh is executed to selectively invoke the plurality of disparate AI dialogue models during a multi-turn conversation with the entity to respond to the one or more natural language inputs.

In one embodiment, the one or more natural language inputs received by the virtual dialogue agent correspond to a plurality of distinct dialogue competencies, each disparate AI dialogue model of the plurality of disparate AI dialogue models is configured to handle a distinct dialogue competency of the plurality of distinct dialogue competencies; each disparate AI dialogue model of the plurality of disparate AI dialogue models includes a respective automated dialogue control system structure encoded with a respective set of dialogue state nodes and a respective set of dialogue state transitions for handling user queries related to the distinct dialogue competency; and the bot orchestration mesh created using the mesh configuration user interface combines the plurality of disparate AI dialogue models into a single composite AI dialogue model that enables the virtual dialogue agent to handle the multi-turn conversation spanning across multiple distinct dialogue competencies.

In one embodiment, the computer-implemented method further includes receiving, from the user, an input selecting the root socket node displayed within the graphical environment of the mesh configuration user interface, instantiating, by the one or more computer processors, an AI assignment popover overlaid on the mesh configuration user interface in response to receiving the input selecting the root socket node, wherein the AI assignment popover includes: an AI version user interface element that, when selected, displays a dropdown menu element of the plurality of disparate AI dialogue models; displaying, within the AI assignment popover, the dropdown menu element of the plurality of disparate AI dialogue models in response to receiving an input from the user selecting the AI version user interface element; and receiving, while displaying the dropdown menu element of the plurality of disparate AI dialogue models, a selection of a menu item included in the dropdown menu element of the plurality of disparate AI dialogue models that corresponds to the first disparate AI dialogue model, wherein: the first disparate AI dialogue model is digitally assigned to the root socket node in response to receiving the selection of the menu item included in the dropdown menu element of the plurality of disparate AI dialogue models that corresponds to the first disparate AI dialogue model.

In one embodiment, the first disparate AI dialogue model of the plurality of disparate AI dialogue models is configured to handle any natural language input provided to the virtual dialogue agent that corresponds to a first distinct dialogue competency, automatically generating the plurality of distinct mesh socket nodes within the graphical environment of the mesh configuration user interface includes: generating a first distinct mesh socket node that functions as a proxy or a container to programmatically invoke a second disparate AI dialogue model of the plurality of disparate AI dialogue models, wherein the second disparate AI dialogue model is configured to handle any natural language input provided to the virtual dialogue agent that corresponds to a second distinct dialogue competency, and generating a second distinct mesh socket node that functions as a proxy or a container to programmatically invoke a third disparate AI dialogue model of the plurality of disparate AI dialogue models, wherein the third disparate AI dialogue model is configured to handle any natural language input provided to the virtual dialogue agent that corresponds to a third distinct dialogue competency.

In one embodiment, a first natural language input of the one or more natural language inputs received by the virtual dialogue agent corresponds to the second distinct dialogue competency, the virtual dialogue agent invokes the second disparate AI dialogue model to respond to the first natural language input that correspond to the second distinct dialogue competency as the second disparate AI dialogue model is operably configured to handle the second distinct dialogue competency, and the virtual dialogue agent does not invoke the third disparate AI dialogue model to respond to the first natural language input as the third disparate AI dialogue model is not operably configured to handle the second distinct dialogue competency.

In one embodiment, a second natural language input of the one or more natural language inputs received by the virtual dialogue agent corresponds to the third distinct dialogue competency, the bot orchestration mesh automatically routes the second natural language input that corresponds to the third distinct dialogue competency to the third disparate AI dialogue model as the third disparate AI dialogue model is operably configured to handle the third distinct dialogue competency, the bot orchestration mesh invokes the third disparate AI dialogue model to generate a conversational response to the second natural language input in response to routing the second natural language input to the third disparate AI dialogue model, the bot orchestration mesh does not route the second natural language input that corresponds to the third distinct dialogue competency to the second disparate AI dialogue model as the second disparate AI dialogue model is not operably configured to handle the third distinct dialogue competency, and the bot orchestration mesh does not invoke the second disparate AI dialogue model to respond to the second natural language input.

In one embodiment, automatically generating the plurality of distinct mesh socket nodes within the graphical environment of the mesh configuration user interface includes generating: a first distinct mesh socket node that functions as a proxy to a second disparate AI dialogue model of the plurality of disparate AI dialogue models, and a second distinct mesh socket node that functions as a proxy to a third disparate AI dialogue model of the plurality of disparate AI dialogue models.

In one embodiment, the computer-implemented method further includes receiving, from the user, a first user input of the plurality of user inputs selecting the mesh socket creation button displayed on the mesh configuration user interface; instantiating, by the one or more computer processors, a socket AI assignment popover overlaid on the mesh configuration user interface in response to receiving the first user input selecting the mesh socket creation button, wherein the socket AI assignment popover includes: an AI version user interface element that, when selected, displays a dropdown menu element of the plurality of disparate AI dialogue models; displaying, within the socket AI assignment popover, the dropdown menu element of the plurality of disparate AI dialogue models in response to receiving an input from the user selecting the AI version user interface element; receiving, while displaying the dropdown menu element of the plurality of disparate AI dialogue models, a selection of a menu item included in the dropdown menu element of the plurality of disparate AI dialogue models that corresponds to the second disparate AI dialogue model, wherein: the first distinct mesh socket node is automatically generated within the graphical environment of the mesh configuration user interface in response to receiving an input from the user selecting a socket generation button displayed on the socket AI assignment popover while the menu item corresponding to the second disparate AI dialogue model is selected.

In one embodiment, the computer-implemented method further includes: receiving, from the user, a second user input of the plurality of user inputs selecting the mesh socket creation button displayed on the mesh configuration user interface; instantiating, by the one or more computer processors, the socket AI assignment popover overlaid on the mesh configuration user interface in response to receiving the second user input selecting the mesh socket creation button; displaying, within the socket AI assignment popover, the dropdown menu element of the plurality of disparate AI dialogue models in response to receiving an additional input from the user selecting the AI version user interface element; receiving, while displaying the dropdown menu element of the plurality of disparate AI dialogue models, a selection of a menu item included in the dropdown menu element of the plurality of disparate AI dialogue models that corresponds to the third disparate AI dialogue model, wherein: the second distinct mesh socket node is automatically generated within the graphical environment of the mesh configuration user interface in response to receiving a selection input from the user selecting the socket generation button displayed on the socket AI assignment popover while the menu item corresponding to the third disparate AI dialogue model is selected.

In one embodiment, constructing, within the graphical environment of the mesh configuration user interface, the plurality of graphical socket transitions includes constructing a first graphical socket transition, wherein constructing the first graphical socket transition includes: receiving, via the mesh configuration user interface, an input from the user selecting an add socket transition button displayed on the mesh configuration user interface; transitioning, in response to receiving the input selecting the add socket transition button, the mesh configuration user interface into a socket transition creation mode that allows the user to construct the first graphical socket transition via a drag-and-drop operation; detecting, by the one or more computer processors, the drag-and-drop operation that connects the root socket node to the first distinct mesh socket node; and instantiating, by the one or more computer processors, a create orchestration transition popover overlaid on the mesh configuration user interface in response to detecting the drag-and-drop operation, wherein the create orchestration transition popover includes: a socket transition type user interface element that, when selected, displays a dropdown menu element of a plurality of distinct socket transition types available to the user, a source state user interface element that, when selected, displays a dropdown menu element of a first plurality of distinct dialogue states nodes included in the first disparate AI dialogue model associated with the root socket node, and a destination state user interface element that, when selected, displays a dropdown menu element of a second plurality of distinct dialogue states nodes included in the second disparate AI dialogue model associated with the first distinct mesh socket node.

In one embodiment, constructing the first graphical socket transition further includes receiving, at the socket transition type user interface element, a user input selecting a target socket transition type from the dropdown menu element of the plurality of distinct socket transition types, receiving, at the source state user interface element, a user input selecting a target dialogue state node included in the dropdown menu element of the first plurality of distinct dialogue states nodes, receiving, at the destination state user interface element, a user input selecting a subject dialogue state node included in the dropdown menu element of the second plurality of distinct dialogue states nodes, wherein the first graphical socket transition is created between the root socket node and the first distinct mesh socket node based on (i) the target socket transition type selected at the socket transition type user interface element, (ii) the target dialogue state node selected at the source state user interface element, and (iii) the subject dialogue state node selected at the destination state user interface element.

In one embodiment, constructing, within the graphical environment of the mesh configuration user interface, the plurality of graphical socket transitions includes constructing a first graphical socket transition, wherein constructing the first graphical socket transition includes receiving, via the mesh configuration user interface, an input from the user selecting an add socket transition button displayed on the mesh configuration user interface; transitioning, in response to receiving the input selecting the add socket transition button, the mesh configuration user interface into a socket transition creation mode that allows the user to construct the second graphical socket transition via a drag-and-drop operation; detecting, by the one or more computer processors, the drag-and-drop operation that starts at the first distinct mesh socket node and ends at the second distinct mesh socket node; and instantiating, by the one or more computer processors, a create orchestration transition popover overlaid on the mesh configuration user interface in response to detecting the drag-and-drop operation, wherein the create orchestration transition popover includes: a socket transition type user interface element that, when selected, displays a dropdown menu element of a plurality of distinct socket transition types available to the user, a source state user interface element that, when selected, displays a dropdown menu element of a first plurality of distinct dialogue states nodes included in the second disparate AI dialogue model associated with the first distinct mesh socket node, and a destination state user interface element that, when selected, displays a dropdown menu element of a second plurality of distinct dialogue states nodes included in the third disparate AI dialogue model associated with the second distinct mesh socket node.

In one embodiment, constructing the second graphical socket transition further includes: receiving, at the socket transition type user interface element, a user input selecting a target socket transition type from the dropdown menu element of the plurality of distinct socket transition types, receiving, at the source state user interface element, a user input selecting a target dialogue state node included in the dropdown menu element of the first plurality of distinct dialogue states nodes, receiving, at the destination state user interface element, a user input selecting a subject dialogue state node included in the dropdown menu element of the second plurality of distinct dialogue states nodes, wherein the second graphical socket transition is created between the first distinct mesh socket node and the second distinct mesh socket node based on (i) the target socket transition type selected at the socket transition type user interface element, (ii) the target dialogue state node selected at the source state user interface element, and (iii) the subject dialogue state node selected at the destination state user interface element.

In one embodiment, a computer-implemented system for controlling a virtual dialogue agent that uses a plurality of disparate artificial intelligence (AI) dialogue models includes one or more computer processors; a memory; a computer-readable medium operably coupled to the one or more computer processors, the computer-readable medium having computer-readable instructions stored thereon that, when executed by the one or more computer processors, cause a computing device to perform operations comprising: instantiating, by the one or more computer processors, a mesh configuration user interface that provides a user with a graphical environment for creating a bot orchestration mesh that controls a use of the virtual dialogue agent and the plurality of disparate AI dialogue models underpinning the virtual dialogue agent; automatically constructing, within the graphical environment of the mesh configuration user interface, a root socket node that functions as an entry point for the bot orchestration mesh in response to instantiating the mesh configuration user interface; digitally assigning, by the one or more computer processors, a first disparate AI dialogue model of the plurality of disparate AI dialogue models to the root socket node in response to receiving, via the mesh configuration user interface, a request from the user to digitally pair the first disparate AI dialogue model to the root socket node; automatically generating, within the graphical environment of the mesh configuration user interface, a plurality of distinct mesh socket nodes based on receiving a plurality of user inputs selecting a mesh socket creation button displayed on the mesh configuration user interface, wherein: each distinct mesh socket node of the plurality of distinct mesh socket nodes is a proxy to a distinct one of the plurality of disparate AI dialogue models; constructing, within the graphical environment of the mesh configuration user interface, a plurality of socket transitions that (i) connect the root socket node to at least a subset of the plurality of distinct mesh socket nodes and (ii) connect target pairs of mesh socket nodes of the plurality of distinct mesh socket nodes together, thereby enabling the virtual dialogue agent to operate across the plurality of disparate AI dialogue models via the bot orchestration mesh; and deploying, via the one or more computer processors, the bot orchestration mesh into a production environment to control the virtual dialogue agent, wherein: in response to the virtual dialogue agent receiving one or more utterances from an entity, the bot orchestration mesh is executed to selectively invoke one or more of the plurality of disparate AI dialogue models during a multi-turn conversation with the entity to respond to the one or more natural language inputs.

In one embodiment, the computer-implemented system further includes training, by the one or more computer processors, a machine learning-based mesh classification model using a plurality of labeled utterances, wherein: each labeled utterance of the plurality of labeled utterances corresponds to a dialogue intent associated with a respective socket transition within the bot orchestration mesh, the machine learning-based mesh classification model is executed to compute an intent classification prediction that corresponds to a respective utterance of the one or more utterances received by the virtual dialogue agent, and the bot orchestration mesh executes a respective socket transition of the plurality of socket transitions that matches the intent classification prediction associated with the respective utterance.

BRIEF DESCRIPTION OF THE FIGURES

FIG. 2 illustrates an example method 200 in accordance with one or more embodiments of the present application;

DESCRIPTION OF THE PREFERRED EMBODIMENTS

Figure 1:
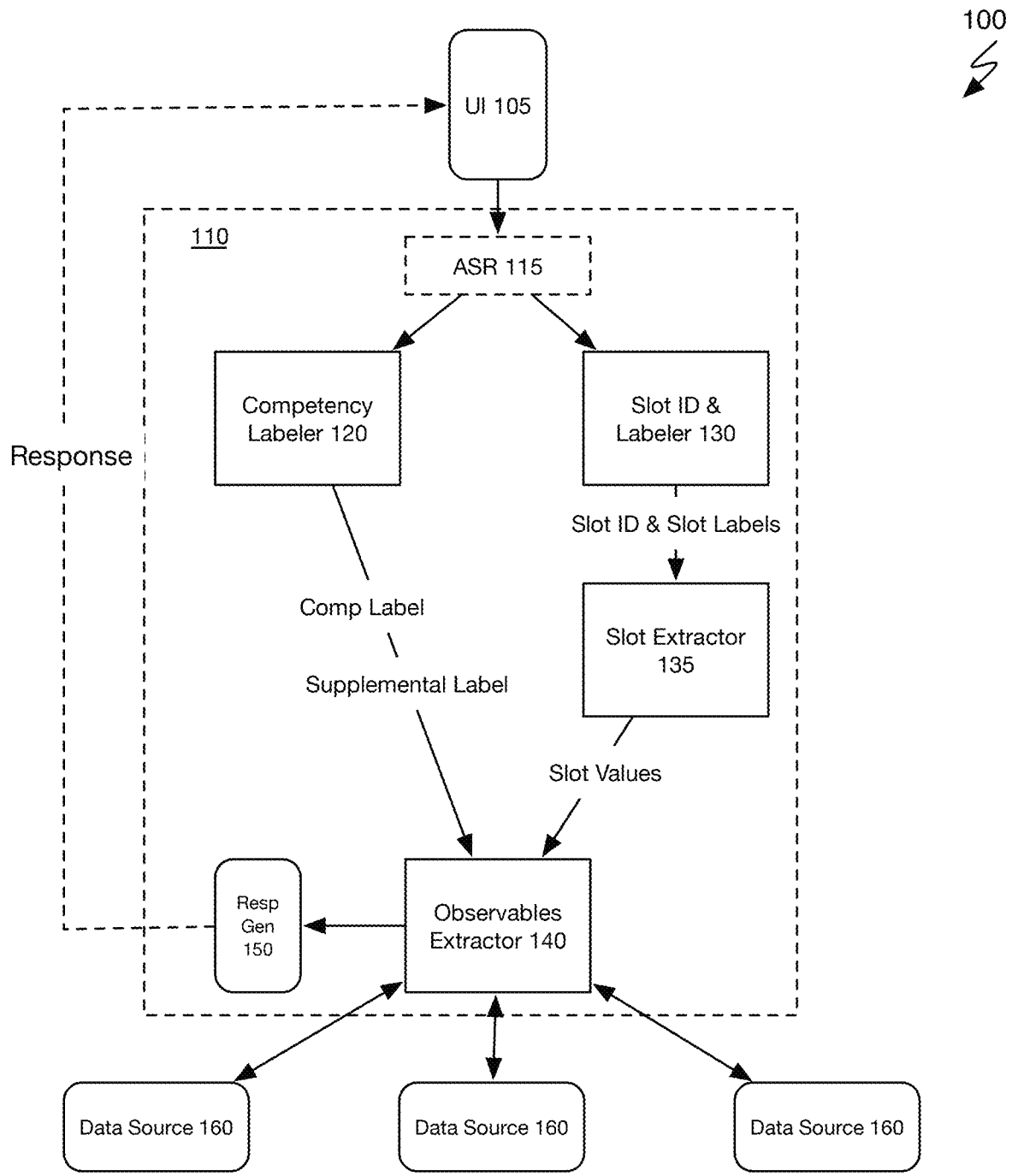
FIG. 1 illustrates a schematic representation of a system 100 in accordance with one or more embodiments of the present application.

The following description of the preferred embodiments of the present application are not intended to limit the inventions to these preferred embodiments, but rather to enable any person skilled in the art to make and use these inventions.

The systems, methods, and computer-program products described herein may be used across a broad range of dialogue automation and conversational artificial intelligence (AI) applications. Such applications may include, but should not be limited to, virtual assistants, multi-domain conversational agents, enterprise support platforms, AI-driven customer service assistants, and voice-enabled virtual agents.

Traditional conversational AI systems use only a single machine learning model that is responsible for handling a broad range of dialogue competencies and user intents. Using a single machine learning model in this manner leads to significant model performance limitations, model scalability issues, and model reliability challenges. Small changes to the single machine learning model intended to improve one dialogue area of the conventional AI system can result in unintended dialogue degradations in other, unrelated dialogue areas of the conventional AI system. This is because all dialogue logic, state transitions, and intent classification behaviors are embedded within a single model boundary and, in turn, updates to the model's training data, architecture, or parameters may alter the model's behavior in unpredictable ways, even in dialogue domains that were not directly modified.

Conversely, the systems, methods, and embodiments described herein enable users to create a virtual dialogue agent that uses a plurality of disparate AI dialogue models, wherein each disparate AI dialogue model of the plurality of disparate AI dialogue models is configured to handle a single distinct dialogue competency. Rather than, relying on a single monolithic machine learning model (as used by conventional AI systems) to manage all user intents and dialogue flows, the systems, methods, and embodiments described herein distributes conversational functionality across a plurality of AI dialogue models that can be selectively invoked based on user input.

In some embodiments, to enable such dynamic, multi-model interaction, the systems, methods, and embodiments described herein may enable a creation and utilization of a model orchestration mesh that serves as the structural and operational backbone of the virtual dialogue agent. The model orchestration mesh, in some embodiments, may be a graph-based architecture that includes a plurality of mesh socket nodes and a plurality of graphical socket transitions that connect the plurality of mesh socket nodes together. Each mesh socket node may function as an operational proxy to a distinct AI dialogue model of the plurality of disparate AI dialogue models, while each socket transition of the plurality of graphical socket transitions may define a dialogue or conversational pathway from one mesh socket node to another mesh socket node. In other words, the socket transitions may control how user inputs, dialogue states, and contextual data are transferred between disparate AI dialogue models and/or mesh socket nodes in real time. It shall be recognized that, in some embodiments, the model orchestration mesh enables precise control over a conversational flow by allowing each AI dialogue model to be independently managed, while coordinating interaction between disparate AI dialogue models through explicitly defined socket transitions that govern when and how control is passed from one dialogue model to another.

At least one technical benefit of creating and/or using the model orchestration mesh enables the use of smaller, competency-specific or task-specific AI dialogue models instead of the single, large monolithic machine learning model used by conventional conversational AI systems. In other words, instead of always having to invoke the large machine learning model that requires extensive compute resources (e.g., 10 terabytes of memory, 30 GPUs, etc.) to run, the model orchestration mesh may selectively invoke only the AI dialogue model of the competency-specific or task-specific AI dialogue models that corresponds to the dialogue competency to which a respective natural language input corresponds—where the invoked AI dialogue model may require as little as 30 gigabytes of memory and a single GPU to run. Thereby, in some embodiments, the systems, methods, and computer-program products described herein provide an improvement over conventional computer systems by reducing the amount of compute resources needed for virtual dialogue agents to respond to natural language inputs.

Another technical benefit of creating and/or using the model orchestration mesh for controlling the operation of a plurality of disparate AI dialogue models associated with the virtual dialogue agent enables a dialogue response (e.g., conversational response or the like) to be generated for a natural language input in less time when compared to conventional conversational AI systems. For instance, in a non-limiting example, rather than using the single, large machine learning model associated with conventional conversational AI systems-which may include tens of billions of parameters (e.g., weights and biases) and/or hundreds of thousands of dialogue paths and dialogue states—to generate a response to a natural language input, the model orchestration mesh may only invoke the AI dialogue model that corresponds to the dialogue competency associated with the natural language input. Because the invoked AI dialogue model includes fewer parameters and a smaller set of dialogue paths and dialogue states when compared to the single, large machine learning model of conventional conversational AI systems, the systems, methods, and computer-program products described herein can perform inference operations (e.g., generate responses to natural language inputs) more quickly and with reduced computational effort, thereby improving response generation during real-time conversational interactions. Thereby, in some embodiments, the systems, methods, and computer-program products described herein provide an improvement over conventional computer systems by reducing inference and/or response latency.

Another technical benefit of creating and/or using the model orchestration mesh for controlling the operation of the plurality of disparate AI dialogue models associated with the virtual dialogue agent enables a reduction in the amount of time and compute resources required to train the virtual dialogue agent when adding a new AI dialogue model that corresponds to a new dialogue competency or modifying a model behavior of an existing AI dialogue model already included in the model orchestration mesh. In other words, in some embodiments, rather than having to retrain the entire single, large machine learning model encompassing all dialogue competencies, the model orchestration mesh enables individual AI dialogue models to be retrained in isolation. Because the model orchestration mesh treats each dialogue competency (e.g., each AI dialogue model) as modular and independently invokable, the systems, methods, and computer-program products described herein avoid the need to retrain all AI dialogue models during a retraining operation, thereby minimizing the amount of compute resources required for training and further preventing inadvertent behavioral drift or performance regressions in AI dialogue models that do not need to be retrained. Thereby, in some embodiments, the systems, methods, and computer-program products described herein provide an improvement over conventional computer systems by localizing model training operations to only target AI dialogue models instead of all AI dialogue models associated with the virtual dialogue agent.

Another technical benefit of the systems, methods, and computer-program products described herein enables the model orchestration mesh to be constructed using a graphical user interface. Conventional conversational AI development tools do not provide mechanisms for interactively assembling and managing complex multi-model dialogue logic. Conversely, the systems, methods, and computer-program products described herein allows users to configure the model orchestration mesh through an interactive graphical environment via a graphical user interface, as described in more detail herein. The graphical user interfaces described herein include many innovative GUI elements that enable the user to construct the model orchestration mesh in as few inputs as possible. Thereby, the systems, methods, and computer-program products described herein provide an improvement over conventional conversational AI development tools by enabling rapid, low-friction construction of complex model orchestration workflows through an input-efficient graphical interface.

It shall be recognized that, in some embodiments, creating the model orchestration mesh via the graphical user interfaces described herein provide an immersive and low-distraction experience. Furthermore, creating the model orchestration mesh in as few inputs as possible (e.g., via input-efficient graphical user interfaces) reduces power usage and improves battery life of battery-operated devices by enabling the user to use the electronic device (e.g., computing device, battery-operated device, etc.) more quickly and efficiently. Therefore, the systems, methods, and computer-program products described herein provide an improvement over conventional conversational AI development tools by reducing cognitive burden on a user, preventing an unnecessary use of resources (e.g., central processing unit (CPU) resources, memory resources, battery resources, etc.), and saving resources (e.g., central processing unit (CPU) resources, memory resources, battery resources, etc.) while creating the model orchestration mesh when compared to conventional methods, which is particularly important in battery-operated devices.

1. System for a Machine Learning-Based Dialogue System

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140.

Generally, the system 100 functions to implement the artificial intelligence virtual assistant platform 110 to enable intelligent and conversational responses by an artificially intelligent virtual assistant to a user query and/or user command input into the system 100, as described in U.S. patent application Ser. No. 15/797,414 and U.S. patent application Ser. No. 15/821,010, which are both incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communicating with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowdsourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering, semi-supervised learning), reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instances, the one or more slot values may function to narrow the pool of response templates selectable by the response generator to a subset of a larger pool of response templates to consider the variations in a query or user command identified in the slot values. The response templates may generally be a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Configuring and Deploying an Orchestrator Mesh of an Automated Dialogue System As shown in FIG. 2, a method 200 for configuring and deploying an orchestrator mesh of an automated dialogue system includes configuring one or more mesh sockets of an orchestrator mesh S210, configuring one or more egress state nodes and one or more ingress state nodes S220, configuring one or more socket transitions based on the one or more egress state nodes and the one or more ingress state nodes S230, and deploying the orchestrator mesh in an automated dialogue system S240.

It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

2.1 Configuring One or More Mesh Sockets of an Orchestrator Mesh

S210, which includes configuring one or more mesh sockets of an orchestrator mesh, may function to construct, define, and/or otherwise modify one or more mesh sockets in the orchestrator mesh and associate each of the one or more mesh sockets with an independent AI version and/or a distinct orchestrator mesh. An orchestrator mesh, as generally referred to herein, may relate to a graphical structure that may function as a networked architecture that may organize and interconnect one or more automated dialogue AI versions ("AI versions") via one or more mesh sockets. In one or more embodiments, an AI version may refer to a distinct iteration or instance of an automated dialogue system or conversational AI that may be independently queried, accessed, and/or executed relative to other AI versions in the orchestrator mesh. That is, each AI version may operate in an automated dialogue without requiring execution, invocation, or activation of any other AI version of the orchestrator mesh. In one or more embodiments, a mesh socket (sometimes referred to herein as a "socket") may refer to a graphical node in the graphical structure of the orchestrator mesh that may act as a container and/or a proxy to an AI version or to an orchestrator mesh.

It shall be noted that the phrase "orchestration mesh" may be interchangeably referred to herein as a "model orchestration mesh" or the like.

Orchestrator Mesh Structure

Figure 3:
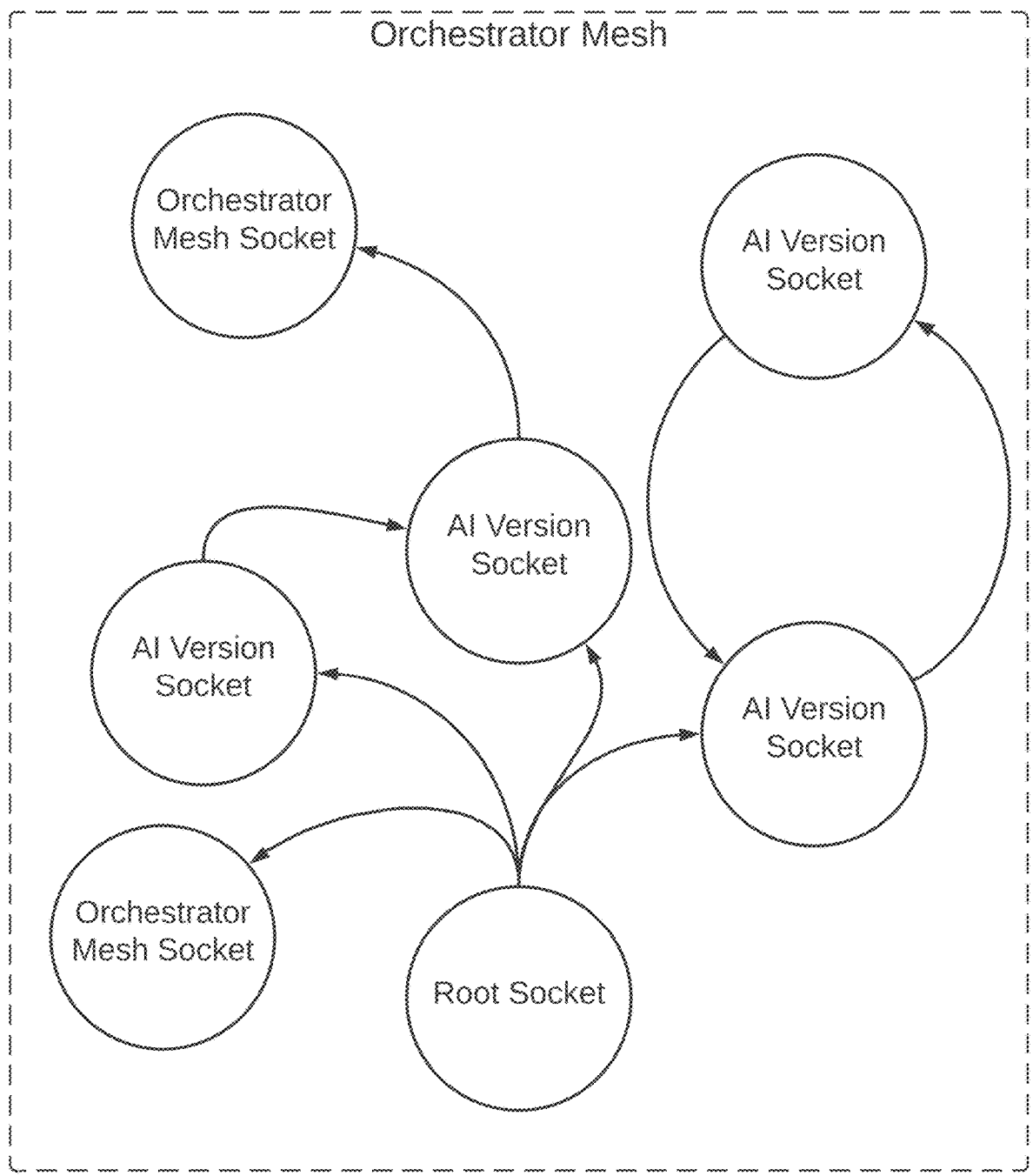
FIG. 3 illustrates an example schematic representation of an orchestrator mesh in accordance with one or more embodiments of the present application.
Figure 12:
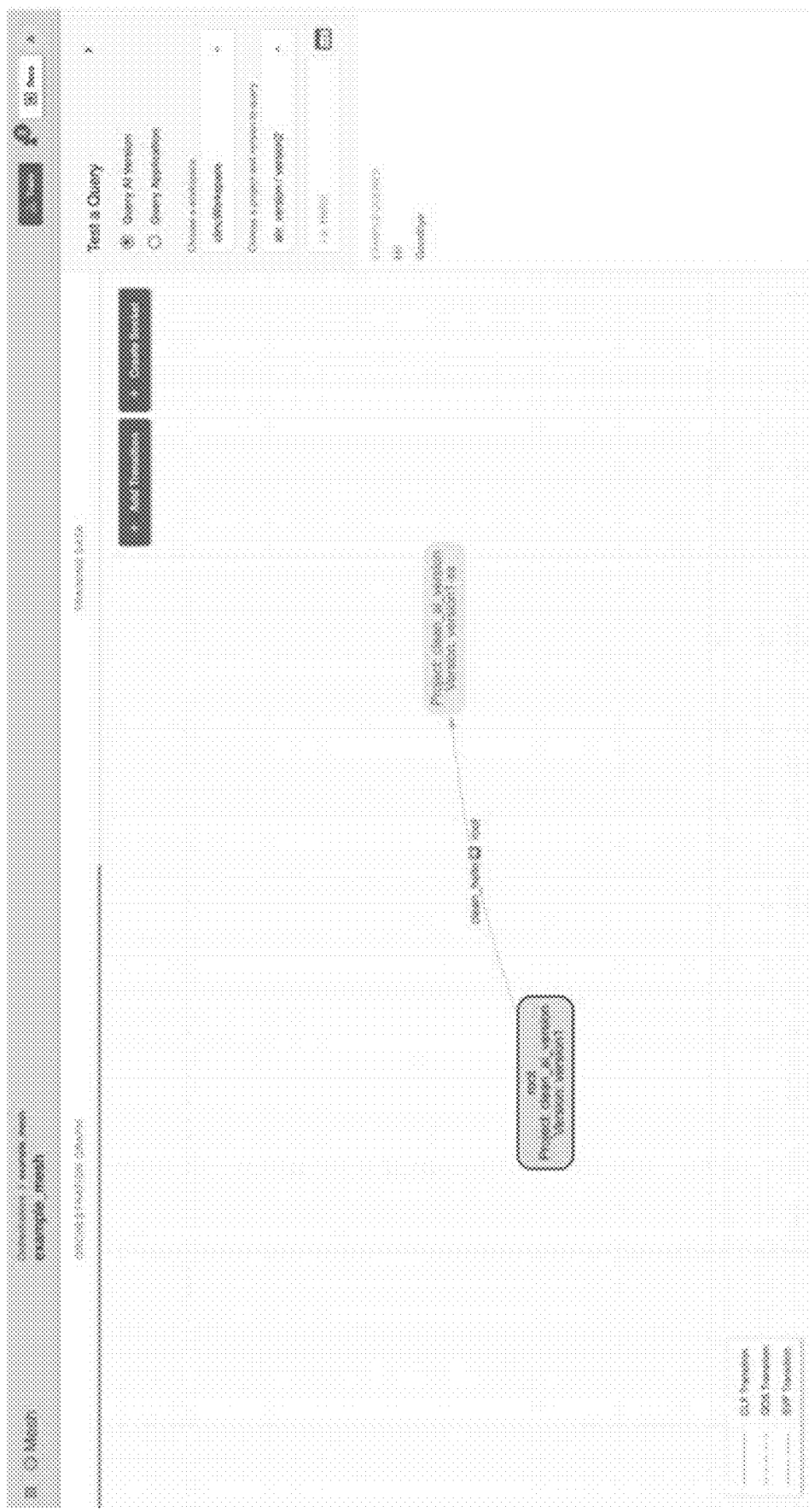
Figure 13:
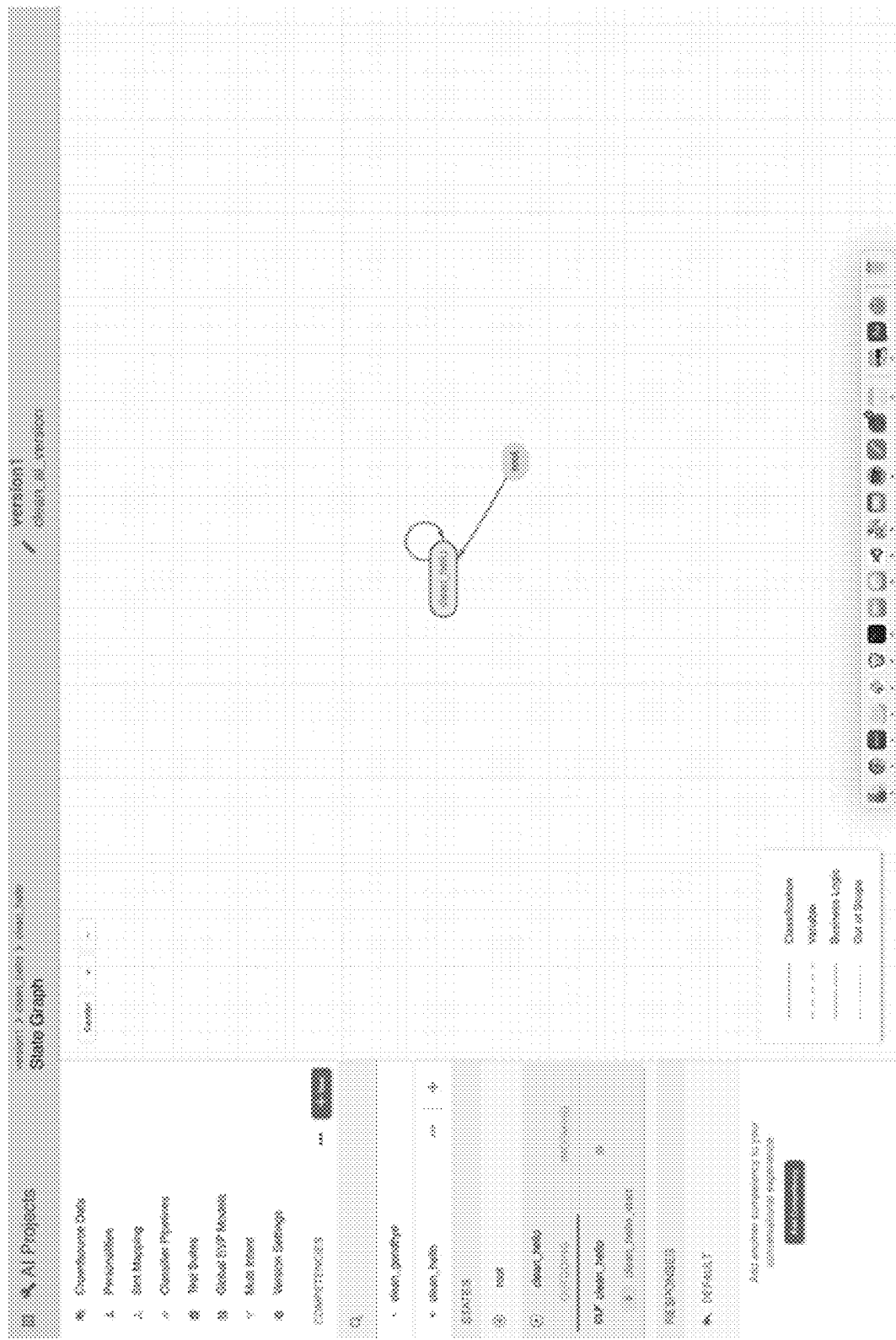

In one or more embodiments, an orchestrator mesh may include or be defined by a graphical data structure that may include one or more mesh sockets digitally linked by one or more socket transitions, as shown by way of example in FIG. 3 and FIG. 12. In some embodiments, each mesh socket may include or be associated with an AI version (e.g., a disparate artificial intelligence (AI) dialogue model or the like). In one or more embodiments, one or more AI versions of an orchestrator mesh may include one or more graph-based AI versions. In such embodiments, each graph-based AI version may include or be otherwise based on a distinct graphical dialogue system control structure (e.g., a state graph) that may be independently operated, traversed, and/or executed to manage an automated dialogue, as shown generally by way of example in FIG. 13. That is, in one or more such embodiments, each graph-based AI version of an orchestrator mesh comprising a distinct graphical dialogue system control structure may be separately and independently executed to guide a dialogue between a virtual dialogue agent and one or more users. In some embodiments, one or more graph-based AI versions may include an automated dialogue system control structure (sometimes referred to herein as a state graph or graphical structure of an AI version), such as the automated dialogue system control structure described in U.S. Pat. No. 11,481,597, which is incorporated in its entirety by this reference.

In some embodiments, the virtual dialogue agent may traverse the state nodes of the automated dialogue system control structures of one or more AI versions in an automated dialogue (conversation) with one or more users. In some such embodiments, the automated dialogue system control structure of an AI version may include one or more state nodes and one or more transitions. A state node, as generally referred to herein, may refer to a graphical node of the automated dialogue system control structure that may represent a distinct point or stage within an automated conversation between a virtual dialogue agent and one or more users. In one or more embodiments, a state node may include or encapsulate one or more automated dialogue features, machine learning models, heuristics, and/or logic that may be configured to handle interactions at the corresponding distinct point in the conversation.

In some embodiments, the one or more of the AI versions in an orchestrator mesh may include one or more RAG-based (or retriever-based) AI versions. A RAG-based AI version may include and/or be otherwise based on one or more retrieval augmented generation (RAG) models and/or other suitable retriever models. In one or more embodiments, each RAG-based AI version may function to implement one or more RAG models to extract responses for the virtual dialogue agent from a repository and/or to base responses of the virtual dialogue agent on one or more corpora of data from a repository. It shall be noted that, in various embodiments, the orchestrator mesh may include one or more graph-based AI versions, one or more RAG-based AI versions, and/or a combination of one or more graph-based AI versions and one or more RAG-based AI versions. Additionally, or alternatively, in various embodiments the orchestrator mesh may include one or more AI versions other than graph-based AI versions and/or RAG-based AI versions that may function to generate, compute, or otherwise output responses for the virtual dialogue agent in the automated dialogue.

Orchestrator Mesh: Sockets

Figure 4:
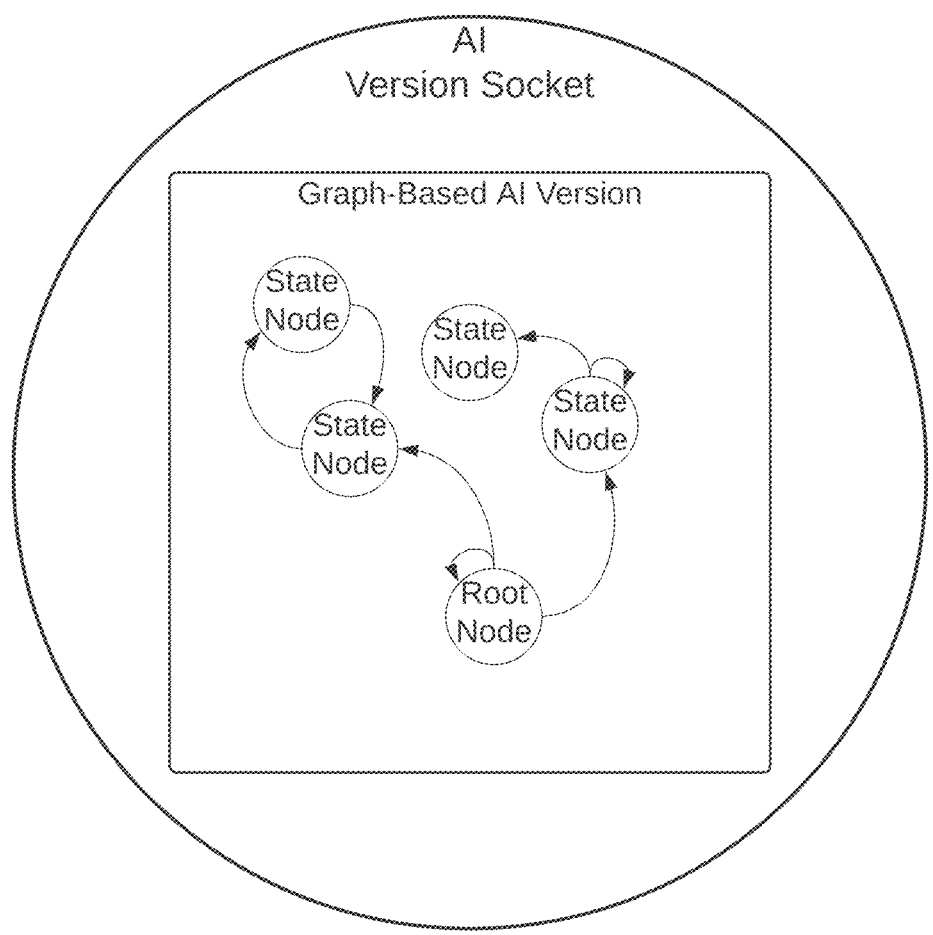
FIG. 4 illustrates an example schematic representation of an AI version mesh socket with a graph-based AI version in accordance with one or more embodiments of the present application.
Figure 5:
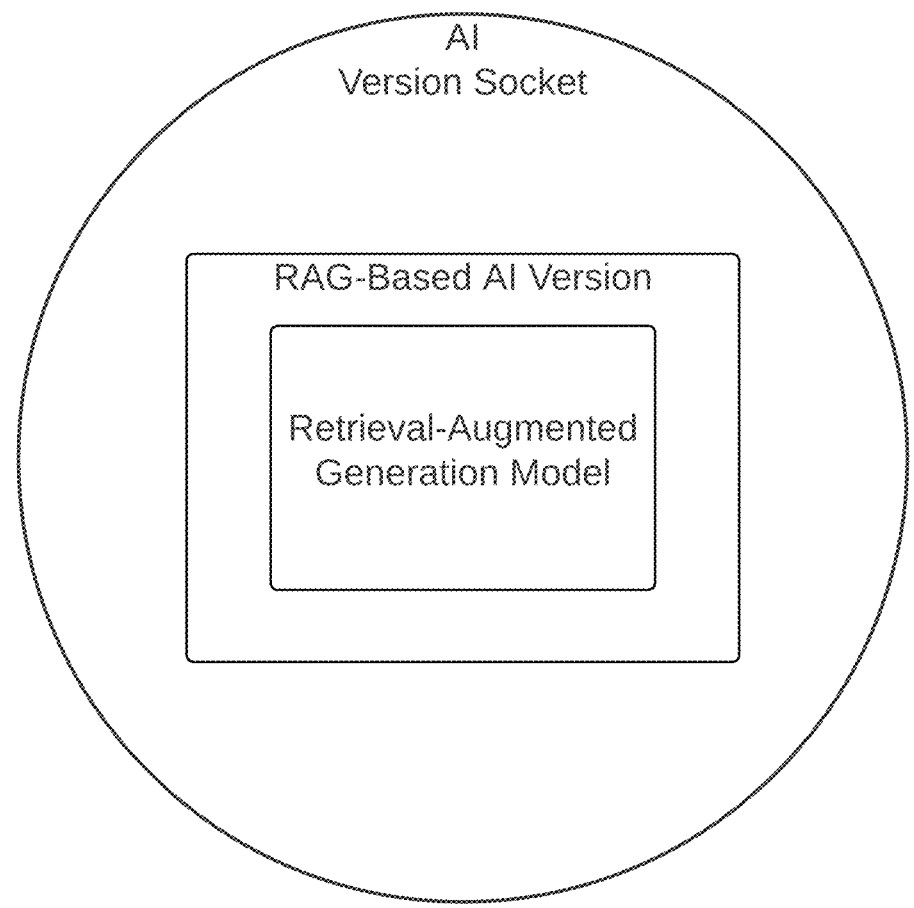
FIG. 5 illustrates an example schematic representation of an AI version mesh socket with a RAG-based AI version in accordance with one or more embodiments of the present application.

Preferably, the orchestrator mesh may include one or more mesh sockets that may each function as a container or proxy for a respective AI version (AI version mesh sockets). In some embodiments, an AI version mesh socket, as shown by way of example in FIGS. 4 and 5, may encapsulate all the resources and functionality associated with its corresponding AI version (e.g., corresponding disparate AI dialogue model), including the automated dialogue system control structure (graphical structure) of a graph-based AI version and the associated dialogue management capabilities of the AI version, and/or the models and/or one or more repositories associated with a RAG-based AI version. In some embodiments, each AI version mesh socket may serve as an interface through which external interactions and mesh transitions may occur, such as transitions between different AI versions and/or an AI version and other external resources or systems. It shall be recognized that the phrase "mesh socket" may be interchangeably referred to herein as a "mesh socket node" or the like.

In some embodiments, the orchestrator mesh may include one or more orchestrator mesh sockets (e.g., mesh socket nodes) that may each function as a container or proxy for a respective orchestrator mesh. That is, in some embodiments, an orchestrator mesh socket in an orchestrator mesh may serve as a container or proxy for another distinct orchestrator mesh, wherein the distinct orchestrator mesh may itself include one or more mesh sockets as described herein. Accordingly, an orchestrator mesh may be linked to one or more distinct orchestrator meshes via one or more corresponding orchestrator mesh sockets.

In some embodiments, the orchestrator mesh may include a root socket (e.g., root socket node, etc.). In such embodiments, a root socket may refer to a graphical control structure (socket) in the orchestrator mesh that may function as a starting point in an automated dialogue managed by the orchestrator mesh. In some embodiments, the root socket may include or be configured with a corresponding AI version that may receive and/or process initial user utterances or queries in an automated dialogue between one or more users and a virtual dialogue agent. Alternatively, in some embodiments, the root socket may not be configured with a corresponding AI version and/or a corresponding automated dialogue system control structure. In some embodiments, the mesh root of the orchestrator mesh may operate as an entry point for one or more user queries or utterances in an automated dialogue; that is, in some embodiments, an initial user query or utterance may be input to the mesh root. Preferably, the mesh root may be connected to one or more mesh sockets of the orchestrator mesh by one or more graphical mesh transitions (e.g., graphical socket transitions or the like).

AI Version: State Nodes

Preferably, the automated dialogue system control structure of an AI version may include one or more dialogue state nodes (state nodes) as conversational components. In such embodiments, a state node may represent a dialogue state of a dialogue flow within the automated dialogue system control structure. In such embodiments, a dialogue state may be a logical component or a data structure (e.g., a data table) of the dialogue system control structure that enables storing one or more pieces of conversational data sourced or extracted from user input (e.g., user utterances or the like), dialogue system derived data, and/or data sourced from one or more machine learning model inferences. In one or more embodiments, a dialogue state may be graphically represented as an extensible dialogue data structure that may include a plurality of distinct entries including, but not limited to, a first entry for at least one dialogue competency (e.g., a competency subnetwork label, enumeration, or identifier), a second entry for at least one dialogue slot value, and/or a state label, enumeration, or identification.

In some embodiments, each dialogue state node, when in operation, may relate to a distinct point or turn in a conversation or active dialogue between a user and the virtual dialogue agent. In such embodiments, each dialogue state node may relate to or be configured with one or more distinct responses generated for the virtual dialogue agent by the automated dialogue system. In some embodiments, each dialogue state node may be associated with one or more utterance processing and/or response generating algorithms, heuristics, and/or the like including, but not limited to, one or more machine learning algorithms, models, or ensembles thereof, one or more logical algorithms (e.g., business logic algorithms), and/or any suitable algorithm, heuristic, or the like for processing user utterances, extracting slots from user utterances, and/or generating responses.

AI Version: Node Transitions

In various embodiments, dialogue state nodes of an AI version may preferably be linked by node transitions (sometimes referred to herein as state transitions or transitions) or a similar logical dialogue nexus that may define and control the conversation flow from one state node to another in the automated dialogue system control structure of an AI version (e.g., disparate AI dialogue model). In various embodiments, the node transitions or similar logical dialogue nexus may be represented by edges, links, and/or the like (e.g., graphical links or graphical edges in a state graph control structure). In one or more embodiments, a dialogue flow for performing some task or operation using a virtual dialogue agent may include a sequence of dialogue state nodes. In some such embodiments, parameters of entries of preceding dialogue state nodes within the sequence of state nodes should be satisfied (e.g., filled) to enable a transition to a subsequent dialogue state node within the sequence. In various embodiments, a node transition may link two different state nodes within a dialogue flow or dialogue sequence. Additionally, and/or alternatively, in some embodiments, a node transition may link a state node to itself.

In some preferred embodiments, a transition type of a node transition may determine how that node transition governs movement between dialogue state nodes associated with that node transition. In one or more embodiments, transition types may include, but are not limited to, classification transitions, slot transitions (sometimes referred to herein as "variable transitions" or "slot/variable transitions), logic transitions, and out-of-scope transitions.

A classification transition, as generally referred to herein, may preferably relate to a node transition based on a classification of user utterance input (e.g., one or more user utterances). In some preferred embodiments, each user utterance may be classified (e.g., by a machine learning classifier) according to one or more intent labels, and each intent label may be associated with a particular or distinct intent of the user utterance. In some such embodiments, each classification transition may be associated with one or more intent labels. In such embodiments, a classification transition may govern a movement in an active dialogue from one associated state to another based on a comparison of intent labels of the classified user utterance to intent labels of the classification transition (e.g., the classification transition may instruct a movement from one state to another in the automated dialogue system control structure if a predicted or classified intent of a user utterance matches one or more intents associated with the classification transition). In one or more embodiments, one or more classification transitions in the automated dialogue system control structure of an AI version may be included or configured. Additionally, in some embodiments, one or more associated intent labels for each classification transition may be identified, selected, added, removed, modified, and/or otherwise configured.

A slot transition (or variable transition), as generally referred to herein, may preferably relate to a transition based on one or more slots extracted from user utterance input. In some embodiments, a slot transition may govern a movement in an active dialogue from one associated state to another once one or more required slots associated with the slot transition have been extracted or filled from user utterance input. In one or more embodiments, one or more slot transitions in the automated dialogue system control structure of an AI version may be included or otherwise configured. Additionally, in some embodiments, one or more associated slots that must be extracted or filled for each slot transition may be identified, selected, added, removed, modified, and/or otherwise configured.

A logic transition, as generally referred to herein, may preferably relate to a transition that may be governed by or based on one or more algorithms, heuristics, code, and/or the like. In some embodiments, a logic transition may be based on logic data or logic programming code attempting an overriding transition to and/or from one or more states of the automated dialogue system control structure. In such instances of such embodiments, if a logic transition matching the logic override is present in the automated dialogue system control structure, the matching logic transition may be executed. In one or more embodiments, one or more business logic transitions in the automated dialogue system control structure of an AI version may be included or otherwise configured.

An out-of-scope transition, as generally referred to herein, may preferably relate to a transition that may be based on a determination of an out-of-scope input or user utterance. In some embodiments, a user utterance and/or user input may be classified or otherwise determined to be out-of-scope relative to a context of a current state in an active dialogue session and/or a current competency (e.g., competency subnetwork) of the active dialogue session. In some such embodiments, an out-of-scope transition may function to direct the active dialogue session to a particular state of the automated dialogue system control structure associated with the out-of-scope transition. In one or more embodiments, one or more out-of-state transitions in the automated dialogue system control structure of an AI version may be included or otherwise configured.

It shall be recognized that, in some embodiments, the system or service implementing method 200 may function to connect, via a graphical user interface or the like, at least two mesh socket nodes together using any of the transitions described above.

AI Version: Competency Subnetworks

In a preferred embodiment, the automated dialogue system control structure of an AI version may include one or more competency subnetworks as conversational components. As referred to herein, a competency subnetwork may relate to a group of one or more topic-related or categorically-related dialogue state nodes that, when operated, may function to enable an automated conversation between a user and a virtual dialogue agent within the one or more topics or categories for which the dialogue state nodes may be programmed. In some preferred embodiments, a competency subnetwork may include state nodes capable of managing a particular competency, function, and/or conversational capability of the automated dialogue system of an AI version. In some embodiments, the one or more related state nodes of a competency subnetwork may be linked to one another by graphical transitions or similar graphical nexus components. In one or more embodiments, each distinct competency subnetwork may include or be associated with a distinct competency subnetwork label, enumeration, identifier, or the like.

In some embodiments, each competency subnetwork may be configured with one or more associated slots. In one or more embodiments, one or more slot value pairing models may each be defined and configured with one or more associated slots, and in turn the one or more slot value pairing models may each be associated with a distinct competency subnetwork and the states within the distinct competency subnetwork. As such, one or more states in a competency subnetwork may each be configured with the model(s) of its competency subnetwork and associated with one or more slots from a competency-level slot value pairing model associated with the competency subnetwork. Additionally, or alternatively, one or more states in a competency subnetwork may each be associated with one or more slots from a global slot value pairing model, wherein the global slot value pairing model may be associated with or configured to any number of competency subnetworks within an AI version. In various embodiments, the associated slots of the competency subnetwork may relate to data (e.g., values, text strings, etc.) to be extracted from user utterances when one or more nodes of the competency subnetwork is in operation. In such embodiments, the one or more associated slots of each competency subnetwork may relate to a particular function or conversational capability of the competency subnetwork.

AI Version: Root Node

In a preferred embodiment, the automated dialogue system control structure of an AI version may include a dialogue root node (root node) as a conversational component. In one or more embodiments, a root node may function to guide the conversation flow of an active conversation or active dialogue to a specific competency subnetwork or other node. Accordingly, in such embodiments, the root node may classify user input data and/or user utterances based on a classification inference output from one or more machine learning models. In turn, in such embodiments, the root node may use the resulting classification inference to determine which dialogue state node or competency subnetwork the conversation flow should be directed toward (e.g., via classification transitions). In some such embodiments, the root node may include one or more corpora of intent labels that may enable the root node to train and/or implement a classifier model that may compute a classification inference output that may be mapped to one or more distinct intent labels of the one or more corpora of intent labels.

Additionally, or alternatively, in some embodiments, the root node may function to transition or direct the conversation flow from one competency subnetwork to another competency subnetwork. In one or more embodiments, the root node may be connected to one or more competency subnetworks and/or one or more dialogue state nodes by one or more graphical transitions (e.g., classification transitions) or similar graphical nexus components.

Mesh Configuration User Interface

Preferably, in some embodiments, S210 may implement a mesh configuration user interface that may enable or facilitate modifying and/or configuring the orchestrated mesh and/or one or more AI versions of the orchestrated mesh. In some embodiments, S210 may function to implement the mesh configuration user interface as a graphical user interface (GUI). In some embodiments, one or more users of the mesh configuration user interface may configure the orchestrator mesh by adding mesh sockets, modifying existing mesh sockets, removing mesh sockets, adding and/or modifying mesh transitions between sockets, and/or by enabling or executing any other suitable mesh configuration action. In some embodiments, one or more users of the mesh configuration user interface may select or configure one or more AI versions (e.g., graph-based AI versions, RAG-based AI versions, disparate AI dialogue models, and/or any other suitable AI version) and/or one or more orchestrator meshes for one or more AI version mesh sockets and/or orchestrator mesh sockets via the mesh configuration user interface. Additionally, or alternatively, in some embodiments, the mesh configuration user interface may be used to modify and/or configure the automated dialogue system of an AI version by adding dialogue state and/or root nodes, modifying existing state and/or root nodes, removing state and/or root nodes, and adding and/or modifying transitions between state and/or root nodes. In various embodiments, the graphical user interface may be used (e.g., by a dialogue system control structure designer and/or the like) to modify, add, and/or remove competency subnetworks of the automated dialogue system control structure of an AI version.

In some embodiments, mesh sockets may be added to and/or deleted from the orchestrator mesh via the mesh configuration user interface by drag-and-drop manipulation. Additionally, or alternatively, in some embodiments, mesh sockets may be added to or removed from the orchestrator mesh via the mesh configuration user interface by selecting the relevant mesh socket(s) using a graphical selection control such as a drop-down list, radio button, checkbox, and/or the like.

In some embodiments, dialogue state nodes may be added to and/or removed from a competency subnetwork or an AI version via the mesh configuration user interface by drag-and-drop manipulation. Additionally, or alternatively, in some embodiments, dialogue state nodes may be added to a competency subnetwork or an AI version by selecting the competency and/or state node using a graphical selection control such as a drop-down list, radio button, checkbox, and/or the like.

In one or more embodiments, the mesh sockets, AI versions, dialogue state nodes, dialogue root nodes, competency subnetworks, and node transitions of the orchestrator mesh and/or the AI version(s) of the orchestrator mesh may be visual GUI objects represented by graphical state nodes, graphical root nodes, graphical competency subnetworks, and graphical transitions as graphical (visual) user interface objects in the mesh configuration user interface.

2.2 Configuring One or More Egress State Nodes and One or More Ingress State Nodes S220, which includes configuring one or more egress state nodes and one or more ingress state nodes, may function to identify and/or designate one or more state nodes in one or more AI version state graphs as egress state nodes (sometimes referred to herein as "egress states") and/or ingress state nodes (sometimes referred to herein as "ingress states") that may facilitate transitions between mesh sockets (e.g., mesh socket nodes) within the orchestrator mesh (e.g., model orchestration mesh). An egress state node, as generally referred to herein, may relate to a state node in the graphical structure (automated dialogue system control structure) of an AI version that may represent a terminal point or exit point of a socket transition from a source socket containing the AI version to another socket. An ingress state node, as generally referred to herein, may relate to a state node in the state graph of an AI version that may represent a terminal point of a socket transition from another socket to a destination socket containing the AI version. In some preferred embodiments, one or more egress state nodes and one or more ingress state nodes may be configured via the mesh configuration user interface.

Figure 6:
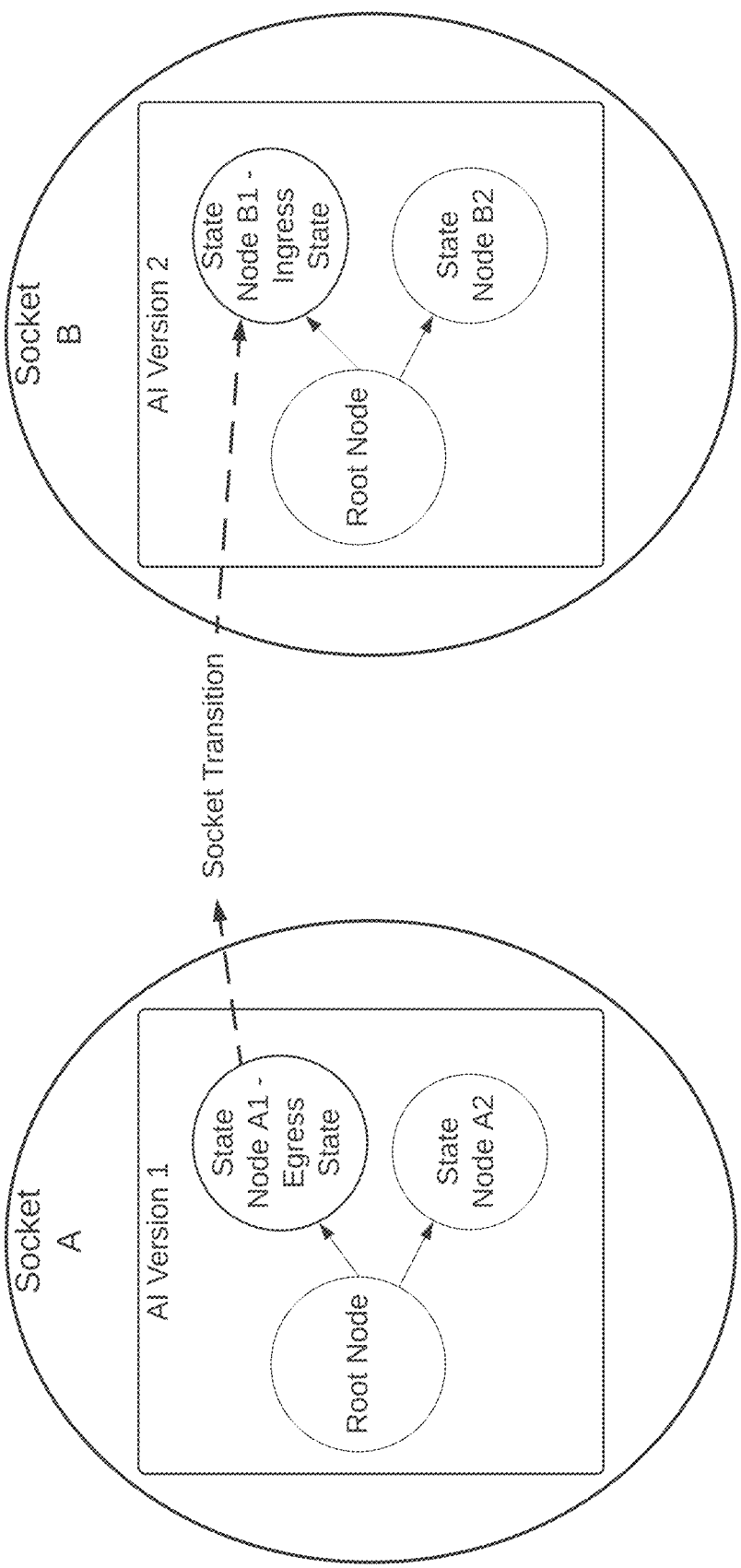
FIG. 6 illustrates an example schematic of a socket transition in accordance with one or more embodiments of the present application.

In one or more embodiments, S220 may preferably include configuring one or more egress state nodes in one or more AI version sockets, as shown by way of example in FIG. 6. In some embodiments, an egress state node may represent a point or state in an automated dialogue flow (conversation flow) from which transitions may be made to other sockets within the orchestrator mesh. In such embodiments, each egress state node may serve as an exit point from the current AI version socket, allowing the virtual dialogue agent to navigate the automated dialogue flow out of the current conversation context as defined by the current state graph of the current AI version to a different AI version or conversation flow. It shall be noted that, in various embodiments, an AI version socket may include zero egress states, one egress state, or a plurality of egress states. That is, in various embodiments, a number E of egress states in an AI version socket of the orchestrator mesh may be greater than or equal to zero.

In one or more embodiments, S220 may preferably include configuring one or more ingress state nodes in one or more AI version sockets. In some embodiments, an ingress state node may represent a point or state in an automated dialogue flow (conversation flow) into which transitions may be made from other sockets within the orchestrator mesh. In such embodiments, each ingress state node may serve as an entry point into an AI version socket, allowing the virtual dialogue agent to navigate the automated dialogue flow into the ingress state of the AI version to continue the conversation based on user utterances, queries, and/or inputs. It shall be noted that, in various embodiments, an AI version socket may include zero ingress states, one ingress state, or a plurality of ingress states. That is, in various embodiments, a number I of ingress states in an AI version socket of the orchestrator mesh may be greater than or equal to zero.

In some preferred embodiments, the one or more egress state nodes and/or the one or more ingress state nodes may be configured via the mesh configuration user interface. In such embodiments, any of the state nodes of the one or more AI versions of the orchestrator mesh may be selected in the mesh configuration user interface and designated or identified as an egress state node or an ingress state node for the respective AI version. In some embodiments, state nodes of the AI versions of the orchestrator mesh may be selected for designation as egress or ingress states by a user interface selection action including, but not limited to, clicking (e.g., mouse click) on a state node, tapping (or similar touch-input) on a state node, and/or any other suitable user interface selection action. Additionally, or alternatively, in some embodiments state nodes of the AI versions may be selected as egress or ingress states by selecting an egress or ingress state option in a contextual menu for each node (e.g., selecting an egress state or ingress state option in a drop-down list, a menu with radio buttons, toggle options, checkboxes, and/or other suitable UI selection controls). In some embodiments, egress states and/or ingress states may be identifiable relative to other state nodes in the mesh configuration user interface by one or more visual feedback indicators including, but not limited to, color (e.g., a distinct color for egress state nodes and/or a distinct color for ingress state nodes relative to the color of other state nodes), shape (e.g., a distinct shape for egress state nodes and/or a distinct shape for ingress state nodes relative to the shape of other state nodes), and/or any other suitable visual feedback indicator for distinguishing egress state nodes and/or ingress state nodes.

2.3 Configuring One or More Socket Transitions Based on the One or More Egress State Nodes and the One or More Ingress State Nodes.

S230, which includes configuring one or more socket transitions based on the one or more egress state nodes and the one or more ingress state nodes, may function to establish and/or configure one or more socket transitions between egress state nodes in source sockets and ingress state nodes in destination sockets. A socket transition, as generally referred to herein, may relate to a graphical transition (e.g., a graphical edge) in the graphical structure of the orchestrator mesh that may be defined between an egress state node in a source socket and an ingress state node in a destination socket, as shown by way of example in FIG. 6. In some embodiments, each socket transition may define a direction of an active automated dialogue flow from the source socket to the destination socket, which may enable a progression in the automated dialogue from one conversation context of the source socket to another conversation context of the destination socket. In some embodiments, one or more of the one or more socket transitions may be defined between distinct source and destination sockets without designating or identifying egress and ingress states of the corresponding sockets.

In some embodiments, the one or more socket transitions may be configured via the mesh configuration user interface. In some preferred embodiments, each socket transition may be visually represented by a (e.g., graphical) line between the corresponding egress and ingress state nodes of the socket transition, and/or between the corresponding source and destination sockets of the socket transition. In a first implementation, a socket transition may be established between an egress state node in a source socket and an ingress state node in a destination socket by click-and-drag interaction, which may enable a user of the mesh configuration user interface to click and drag from an egress state in one socket to an ingress state in another socket. Additionally, or alternatively, in a second implementation, upon selecting an egress state node in a socket, the mesh configuration user interface may display a contextual menu that may include options for configuring a socket transition (e.g., a list of ingress state nodes in other sockets that may be selected to establish a socket transition between the selected egress state node and the selected ingress state node). Additionally, or alternatively, in a third implementation, a user of the mesh configuration user interface may drag an egress state node from one socket onto an ingress state node in another socket (and/or drag an ingress state node from one socket onto an egress state node in another socket) to establish a socket transition between the two nodes in the two sockets. Additionally, or alternatively, in a fourth implementation, the mesh configuration user interface may include a toolbar, panel, and/or other graphical user interface container with a list of one or more egress nodes and/or one or more ingress nodes, and a user of the mesh configuration user interface may select an egress node and an ingress node in the list to establish a socket transition between the two selected nodes. It shall be noted that the above implementations for establishing and/or configuring a socket transition in the mesh configuration user interface may be used independently or in combination with one another. Additionally, it shall be noted that S230 may function to implement any other suitable method of identifying and/or selecting egress and ingress state nodes to establish or configure a socket transition.

In one or more embodiments, configuring one or more socket transitions may include configuring one or more socket classification transitions. A socket classification transition, as referred to herein, may relate to a socket transition that may link two mesh sockets such that the socket classification transition may be executed in an active automated dialogue flow based on a classification of user utterance input. In some preferred embodiments, each user utterance in an active automated dialogue may be classified by a mesh classifier model (or an ensemble of models) at each state or step of the active automated dialogue according to one or more intent labels, and each intent label may be associated with a particular or distinct intent of the user utterance. In such embodiments, the mesh classifier model may refer to one or more models that may function to compute or output an intent classification inference based on an input of one or more user utterances. In one or more embodiments, during traversal of the orchestrator mesh in an active automated dialogue, the mesh classifier model may replace or supersede one or more (or all) classifier model(s) of the underlying egress state of an active mesh socket.

In some embodiments, each socket classification transition may be configured or associated with one or more intent labels. In such embodiments, a socket classification transition may govern a movement in an active dialogue from an egress state in a source socket to an ingress state in a destination socket based on a comparison or mapping of intent labels of the classified user utterance to intent labels of the socket classification transition (e.g., the socket classification transition may instruct a movement from the egress state in the source socket to the ingress state in the destination socket in the orchestrator mesh if a predicted or classified intent of a user utterance matches one or more intents associated with the socket classification transition). In some such embodiments, the mesh classifier model may function to compute or output the predicted intent of the user utterance and map the predicted intent to the one or more intent labels associated with the socket classification transition.

In one or more embodiments, S230 may additionally function to identify, select, add, remove, modify, and/or otherwise configure one or more associated intent labels for each socket classification transition. In some embodiments, intent labels for each socket classification transition may be configured via the mesh configuration user interface. In some embodiments, intent labels for each socket classification transition may be configured via one or more graphical user interface selection controls or objects (e.g., a dropdown list, a list of radio buttons, a list of checkboxes, and/or the like). Alternatively, in some embodiments, intent labels for each socket classification transition may be input directly by a user of the mesh configuration user interface (e.g., via text input fields or the like).

In some embodiments, one or more intent classification corpora or intent label corpora may be curated by one or more users of the mesh configuration user interface as one or more training corpora for the mesh classifier model. In some embodiments, intent labels and/or one or more intent label corpora for a socket classification transition may be imported from the associated ingress state, and/or the AI version of the destination socket (e.g., from state classification transitions from the graphical structure of the AI version of the destination socket). In some such embodiments, one or more users of the mesh configuration user interface may select one or more (or all) intent classification corpora from a root node of the graphical control structure of the AI version contained in the destination mesh socket. Additionally, or alternatively, in one or more embodiments, any training data (e.g. intent labels, intent label corpora, and/or the like) associated with the classifier model(s) of the AI version socketed in the destination mesh socket may be automatically imported into the training set for the mesh classifier model. In such embodiments, intent classes for native outgoing transitions from the egress state may still be classified into and intra-AI version transitions (e.g., transitions from the egress state to other states in the AI version of the source socket) may continue to be executed.

In various embodiments, importing intent labels or intent label corpora from the destination socket may enable the socket classification transition to direct the active dialogue from the source socket to the destination socket when a user utterance is directed to one or more intents associated with the destination socket. In one or more such embodiments, S230 may function to automatically construct one or more training corpora for the mesh classifier model based on the imported and/or curated intent classification corpora or intent label corpora. in turn, in some embodiments, S230 may function to train the mesh classifier model based on the one or more constructed training corpora.

In one or more embodiments, the system or service implementing method 200 may function to train, using the one or more computer processors, a machine learning-based mesh classification model using a plurality of labeled utterances. In such an embodiment, each labeled utterance of the plurality of labeled utterances may correspond to a distinct dialogue intent associated with a subject graphical socket transition within the model orchestration mesh. Additionally, in such an embodiment, the machine learning-based mesh classification model may be executed to compute an intent classification prediction that corresponds to a respective natural language input received by the virtual dialogue agent and, in turn, the model orchestration mesh may execute or use a respective graphical socket transition that matches the intent classification prediction computed for the respective natural language input.

2.4 Deploying the Orchestrator Mesh in an Automated Dialogue System

S240, which includes deploying the orchestrator mesh in an automated dialogue system, may function to implement the graphical structure of the orchestrator mesh as a control structure for managing and guiding an active automated dialogue or conversation between one or more users and a virtual (digital) dialogue agent of an automated dialogue system implementing method 200. That is, in one or more embodiments, the automated dialogue system may traverse the graphical structure of the orchestrator mesh, which may include traversing the graphical structures of one or more AI versions of the orchestrator mesh, which may in turn control and coordinate a conversation (dialogue) flow between the one or more users and the virtual dialogue agent. For example, in some preferred embodiments, the automated dialogue system may function to conduct and/or manage one or more active conversations between the one or more users and the virtual dialogue agent based on the graphical structure of the orchestrator mesh until a conclusion or cessation of the active conversation.

Orchestrator Mesh Traversal

In one or more embodiments, S240 may function to implement the orchestrator mesh in an active automated dialogue. In some embodiments, implementing the orchestrator mesh in the active automated dialogue may include receiving one or more user utterances via an automated dialogue user interface. In various embodiments, the automated dialogue user interface may be implemented as a graphical user interface (GUI), a voice user interface, a text user interface, and/or any other suitable user interface for receiving user input and/or user utterances. Preferably, one or more user utterances may be collected via the automated dialogue user interface, and in turn the one or more user utterances may be processed by one or more sockets or graphical nodes of the orchestrator mesh.

In some embodiments, an initial user utterance may be processed by the root socket of the orchestrator mesh. In such embodiments, the root socket may include and/or be linked to one or more mesh sockets (e.g., AI version mesh sockets) via one or more socket transitions (e.g., socket classification transitions). In such embodiments, the root socket may function to identify an appropriate linked socket that may best serve the intent of the initial user utterance, and in turn the root socket may function to transition the active automated dialogue to the identified linked socket.

As a non-limiting example, the root socket may be linked to a quantity N of AI version mesh sockets by N socket classification transitions. In such an example, the root socket may function to classify the initial user utterance based on the N socket classification transitions. In such an example, the root socket may employ one or more classifiers (e.g., the mesh classifier model and/or one or more machine learning models) to compute a label to the initial user utterance, and in turn the one or more classifiers may function to map the computed label to one of the intents of the N socket classification transitions. In some such examples, the one or more classifiers may function to compute a classification confidence score for one or more (or each) intent of one or more (or each) of the N socket classification transitions. In such an example, the classification confidence score may refer to a computed value in a range (e.g., a value between 0 and 1, between 0 and 100, and/or the like) that may indicate how likely the corresponding intent is the correct intent of the initial user utterance (e.g., a high value relative to the range may represent a high confidence or likelihood, and a low value relative to the range may represent a low confidence or likelihood). In some such examples, the root socket may function to execute the socket classification transition that may have the highest classification confidence score. That is, in such an example, the root socket may function to identify the intent of the initial user utterance and direct the state of the active automated dialogue to the AI version mesh socket that best matches the intent of the initial user utterance.

In some embodiments, once the active automated dialogue has transitioned to an AI version mesh socket, the automated dialogue system may traverse the nodes of the AI version associated with the AI version mesh socket. That is, the nodes and transitions of the graphical structure of the AI version associated with the mesh socket may govern the responses of the virtual dialogue agent to user utterances or queries in the active automated dialogue, as described in U.S. Pat. No. 11,481,597. In some embodiments, once the active dialogue has transitioned to an AI version mesh socket, the initial user utterance and/or subsequent user utterances may be processed by the automated dialogue system control structure (the graphical structure) of the corresponding AI version of the AI version mesh socket.

As a non-limiting example, an AI version may include an automated dialogue system control structure with a root node and one or more state nodes, where the root nodes and state nodes are interconnected by one or more node transitions (as described above in 2.1). In such an example, the initial user utterance may be processed by the root node of the AI version, which may in turn execute one of the one or more node transitions based on the initial user utterance and the transition type(s) of the one or more node transitions (as described in 2.1) and/or prompt or initiate one or more responses of the virtual dialogue agent. In such an example, the nodes and/or the transitions of the graphical control structure of the AI version may guide and control the active automated dialogue between the one or more users and the virtual dialogue agent.

In some embodiments, during the active automated dialogue, an egress state node of an AI version may be entered or activated (e.g., a node transition to an egress state node in the AI version may be executed). In some such embodiments, if the egress state node is linked to one or more other mesh sockets by one or more socket transitions, S240 may function to determine if a user utterance or user query may trigger one of the one or more socket transitions from the egress state. In such embodiments, if one of the one or more socket transitions is triggered, S240 may function to transition the state of the active dialogue from the egress state to the ingress state of the destination socket defined by the triggered socket transition (as described in 2.3). In such a way, S240 may function to guide the active automated dialogue from one mesh socket to another based on triggered socket transitions.

As a non-limiting example, while an egress state node is active in an active automated dialogue (i.e., the current state of the automated dialogue is defined by an egress state node of an AI version), a user may input an utterance to the automated dialogue system. In such an example, S240 may function to determine if an intent of the user utterance may be classified and mapped to one or more intents of a socket classification transition from the egress state node of the source socket to an ingress state node of a destination socket (as described in 2.3). In such an example, if S240 determines that the user utterance may be mapped to an intent of the socket classification transition, S240 may execute or trigger the socket classification transition to change the state of the automated dialogue from the state defined by the egress state node to the state defined by the ingress state node of the destination socket.

Figure 7:
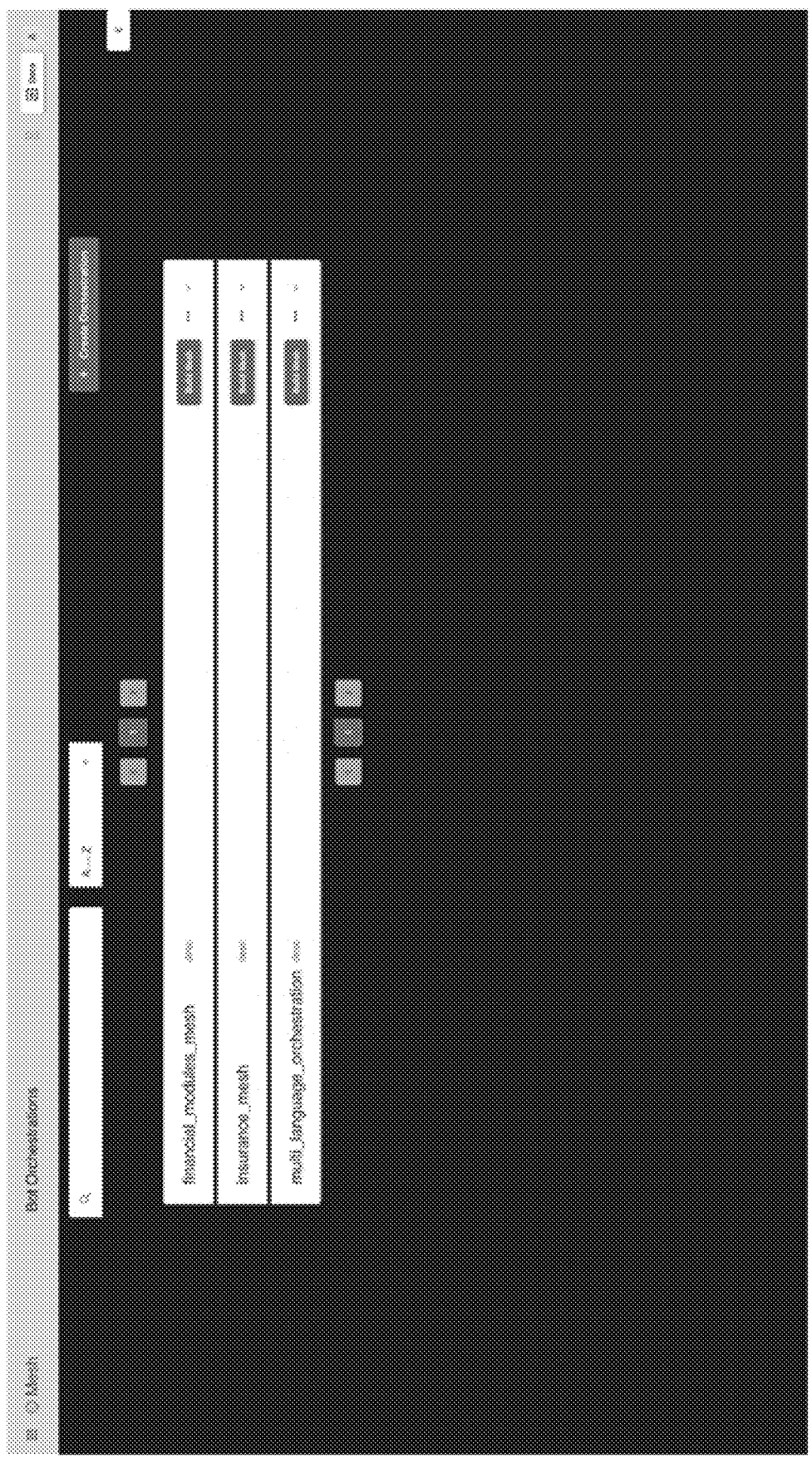
FIGS. 7-13 illustrate example graphical user interfaces in accordance with one or more embodiments of the present application.

Turning to FIG. 7, in one or more embodiments, the system or service implementing method 200 may function to instantiate, by one or more computer processors, a mesh configuration user interface (UI) that provides a user with a graphical environment for creating a model orchestration mesh that may control an operation of a plurality of disparate AI dialogue models associated with, underpinning, or to be used by a virtual dialogue agent. The system or service implementing method 200 may function to instantiate in real-time, by the one or more computer processors, the mesh configuration user interface in response to receiving an input selecting a create orchestration button displayed on a graphical user interface or the like.

Figure 8:
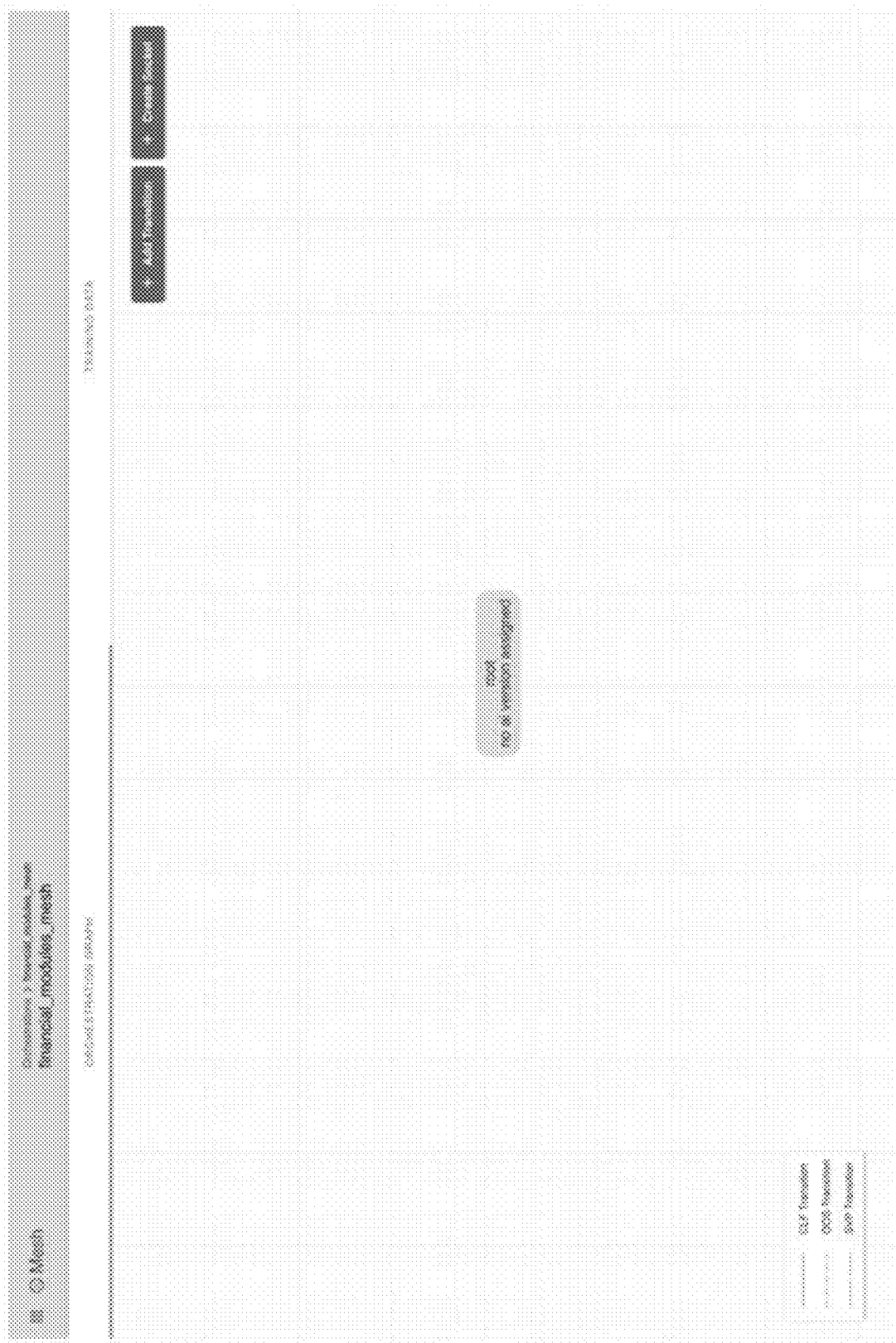

Accordingly, in one or more embodiments, in response to instantiating the mesh configuration UI, the system or service implementing method 200 may function to automatically install, within the graphical environment of the mesh configuration user interface, a root socket node that may function as an entry point for input data into the model orchestration mesh, as shown generally by way of example in FIG. 8. It shall be recognized that, in some embodiments, the root socket node may not have an AI version (e.g., disparate AI dialogue model) assigned thereto and so the user may need to select a target AI version or a target disparate AI dialogue model as the entry point into the model orchestration mesh.

In one or more embodiments, the system or service implementing method 200 may function to digitally assign, by the one or more computer processors, a first disparate AI dialogue model of the plurality of disparate AI dialogue models to the root socket node in response to receiving, via the mesh configuration UI, a request from the user to digitally pair the first disparate AI dialogue model to the root socket node. For instance, in a non-limiting example, the mesh configuration UI may function to receive, from the user, an input selecting the root socket node displayed within the graphical environment of the mesh configuration UI and, in turn, the mesh configuration UI may function to instantiate, by the one or more computer processors, an AI assignment popover overlaid on the mesh configuration UI in response to receiving the input selecting the root socket node. The AI assignment popover may include an AI model UI element that, when selected, displays a dropdown menu element of the plurality of disparate AI dialogue models. Accordingly, in one or more embodiments, the system or service implementing method 200 may function to display, within the AI assignment popover, the dropdown menu element of the plurality of disparate AI dialogue models and while displaying the dropdown menu element of the plurality of disparate AI dialogue models, the system or service implementing method 200 may function to receive a selection of a menu item included in the dropdown menu element of the plurality of disparate AI dialogue models that corresponds to the first disparate AI dialogue model. It shall be recognized that, in some embodiments, the first disparate AI dialogue model may digitally be assigned to the root socket node, in real-time or near real-time, in response to receiving the selection of the menu item included in the dropdown menu element of the plurality of disparate AI dialogue models that corresponds to the first disparate AI dialogue model.

Additionally, or alternatively, in one or more embodiments, the system or service implementing method 200 may function to automatically generate in real-time, within the graphical environment of the mesh configuration UI, a plurality of distinct mesh socket nodes (e.g., at least two distinct mesh socket nodes, at least 500 distinct mesh socket nodes, at least 1,000 distinct mesh socket nodes, etc.) in response to or based on receiving a plurality of user inputs operating a mesh socket creation button displayed on the mesh configuration UI. It shall be recognized that, in such an embodiment, each distinct mesh socket node of the plurality of distinct mesh socket nodes may comprise an operational proxy of a distinct one of the plurality of disparate AI dialogue models.

Figure 9:
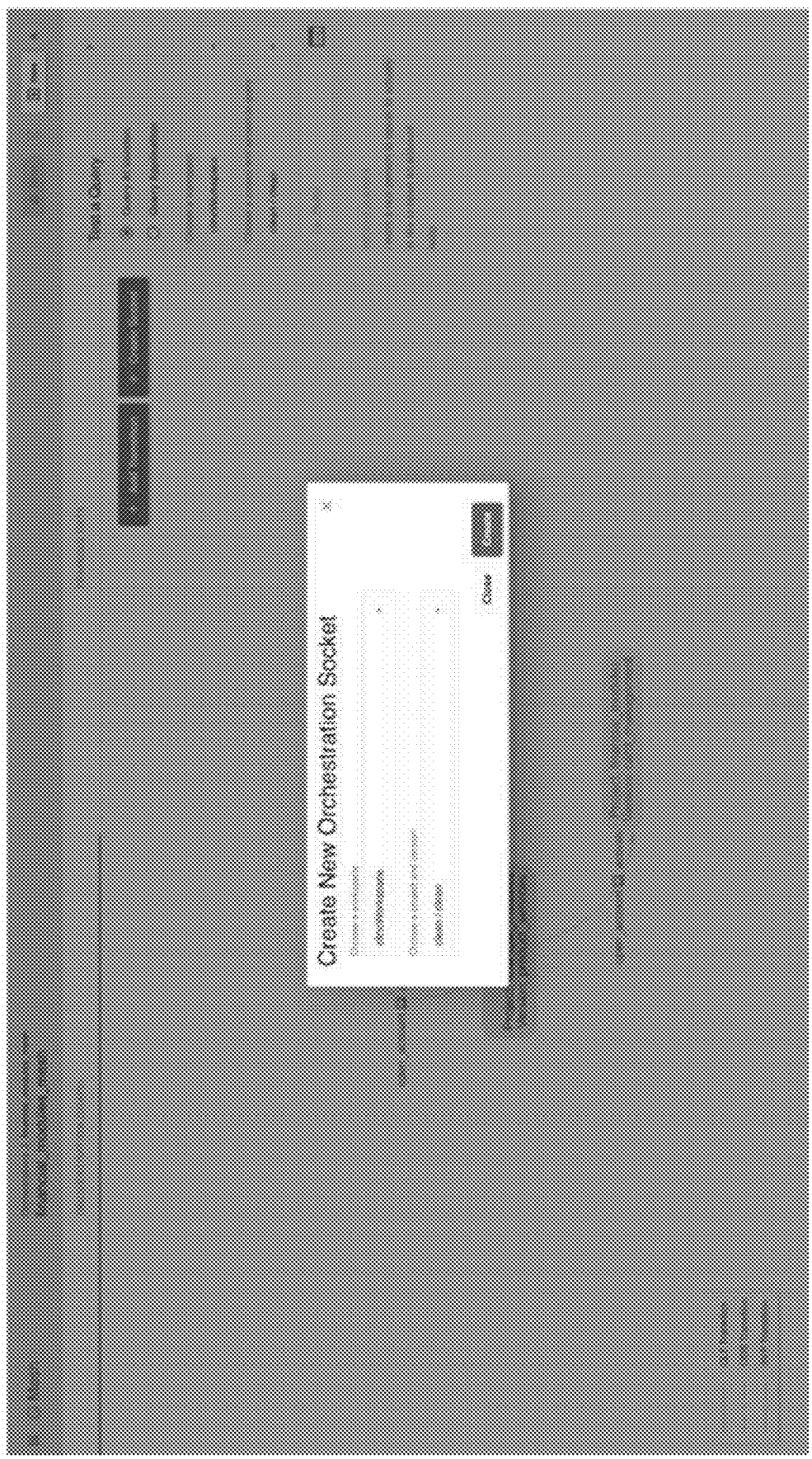

For instance, in a non-limiting example, automatically generating the plurality of distinct mesh socket nodes within the graphical environment of the mesh configuration UI may include generating a first distinct mesh socket node that comprises an operational proxy to a second disparate AI dialogue model of the plurality of disparate AI dialogue models. In such a non-limiting example, in response to receiving a first user input operating the mesh socket creation button displayed on the mesh configuration UI, the system or service implementing method 200 may function to instantiate, by the one or more computer processors, a socket AI assignment popover overlaid on the mesh configuration UI, as shown generally by way of example in FIG. 9. The socket AI assignment popover may include an AI model UI element or the like that, when selected, displays a dropdown menu element of the plurality of disparate AI dialogue models. Furthermore, in such a non-limiting example, the system or service implementing method 200 may function to display, within the socket AI assignment popover, the dropdown menu element of the plurality of disparate AI dialogue models in response to receiving an input from the user selecting the AI model UI element. Accordingly, in one or more embodiments, while displaying the dropdown menu element of the plurality disparate AI dialogue models, the system or service implementing method 200 may function to receive a selection of a menu item included in the dropdown menu element of the plurality of disparate AI dialogue models that corresponds to the second disparate AI dialogue model. It shall be recognized that, in such a non-limiting example, the first distinct mesh socket node may be automatically generated within the graphical environment of the mesh configuration UI in response to receiving an input from the user selecting a socket generation button displayed on the socket AI assignment popover while the menu item corresponding to the second disparate AI dialogue model is selected (e.g., the first distinct mesh socket node comprises the operational proxy to the second disparate AI dialogue model based at least one the user provided inputs).

Additionally, or alternatively, in one or more embodiments, automatically generating the plurality of distinct mesh socket nodes within the graphical environment of the mesh configuration UI may include generating a second distinct mesh socket node that comprises an operational proxy to a third disparate AI dialogue model of the plurality of distinct AI dialogue models. For instance, in a non-limiting example, in response to receiving a second user input that operates (e.g., selects) the mesh socket creation button displayed on the mesh configuration UI, the system or service implementing method 200 may function to instantiate, by one or more computer processors, another instance of the socket AI assignment popover. In one or more embodiments, the system or service implementing method 200 may function to display, within the socket AI assignment popover, the dropdown menu element of the plurality of disparate AI dialogue models in response to receiving a subsequent input from the user selecting the AI model UI element. Accordingly, in one or more embodiments, the system or service implementing method 200 may function to receive, while displaying the dropdown menu element of the plurality of disparate AI dialogue models, a selection of a menu item included in the dropdown menu element of the plurality of disparate AI dialogue models that corresponds to the third disparate AI dialogue model. It shall be recognized that, in such an embodiment, the second distinct mesh node is automatically generated within the graphical environment of the mesh configuration UI in response to receiving a further subsequent input from the user selecting the socket generation button displayed on the socket AI assignment popover while the menu item corresponding to the third disparate AI dialogue model is selected (e.g., the second distinct mesh socket node comprises the operational proxy to the third disparate AI dialogue model).

Figure 10:
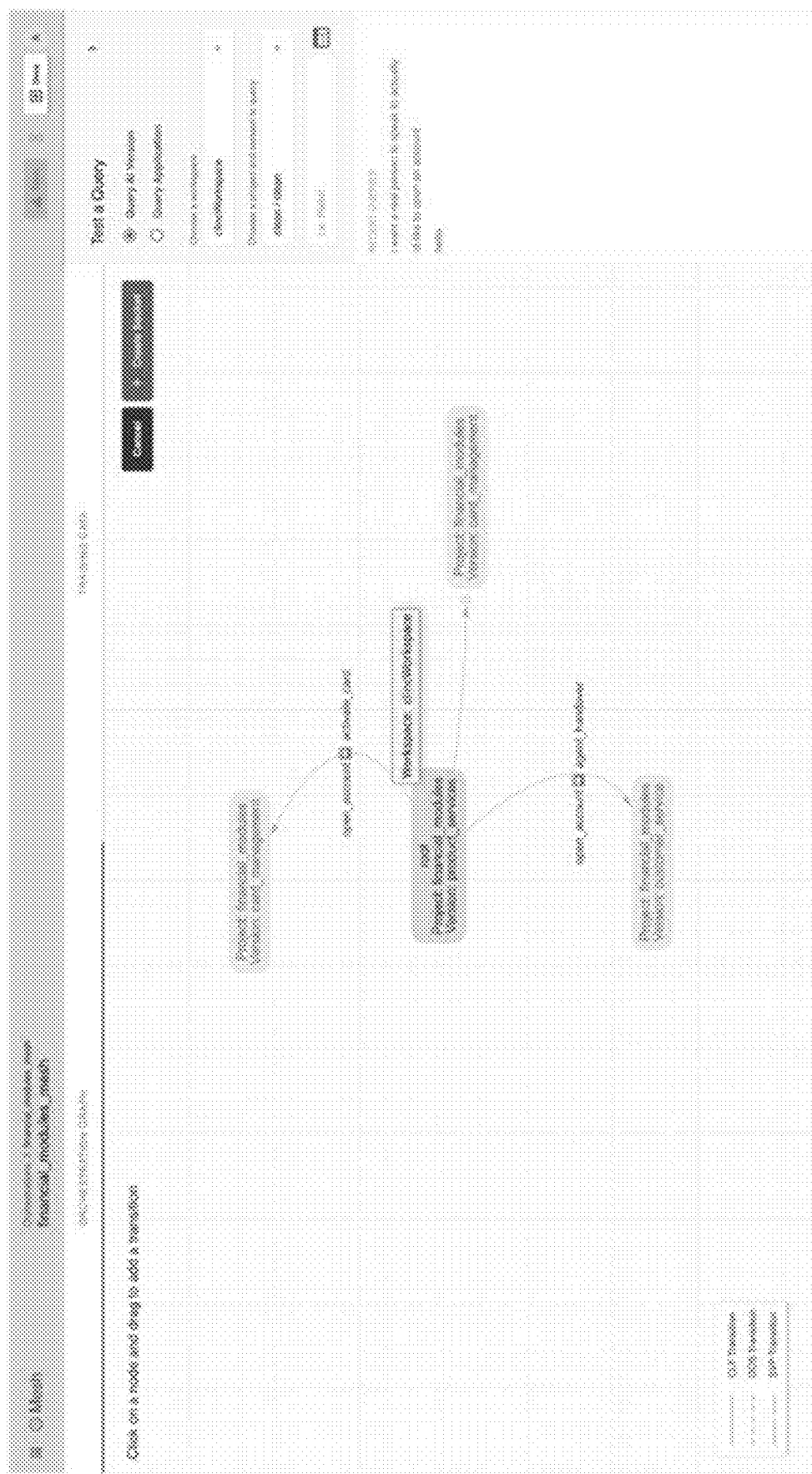

Furthermore, in one or more embodiments, the system or service implementing method 200 may function to receive, via the mesh configuration UI, an input from the user selecting a graphical UI control element displayed on the mesh configuration UI that, when selected, changes a state of the mesh configuration UI to an interactive gesture-based tracking state, as shown generally by way of example in FIG. 10. In other words, before the graphical UI control element is selected, the mesh configuration UI operates in a passive or static display state in which dialogue model components, socket nodes, and/or socket transitions are visually rendered but not responsive to gesture-based inputs (e.g., the passive or static display state is in a read only state). Upon receiving a selection of the graphical UI control element, the mesh configuration UI transitions into an interactive gesture-based tracking state in which the mesh configuration UI actively monitors user interactions—such as drag-and-drop movements, directional swipes, tap gestures, or node-linking gestures—for the purpose of capturing and interpreting these user interactions (e.g., inputs) as model orchestration mesh construction commands. At least one technical benefit of such a gesture-based tracking state enables the user to dynamically construct, modify, or remove graphical socket transitions using intuitive, real-time interactions with graphical elements as described in more detail herein.

Accordingly, in one or more embodiments, while the mesh configuration UI is in the interactive gesture-based tracking state, the system or service implementing method 200 may function to construct, within the graphical environment of the mesh configuration UI, a plurality of graphical socket transitions that connects the root socket node to at least a subset of the plurality of distinct mesh socket nodes and/or connects target pairs of mesh socket nodes of the plurality of distinct mesh socket nodes together. This may enable, during runtime of the virtual dialogue agent, dialogue data packets to be transferred between the root socket node and the plurality of distinct mesh socket nodes as enforced by or in accordance with the plurality of graphical socket transitions.

In one or more embodiments, the interactive gesture-based tracking state may enable the user to construct a respective graphical socket transition of the plurality of graphical socket transitions by performing a sequence of inputs (e.g., continuous sequence of inputs). The sequence of inputs may include one or more of (i) selecting, using a mouse cursor, a visual representation of the root socket node displayed on the mesh configuration UI, wherein selecting the visual representation of the root socket node designates the root socket node as an egress socket node, (ii) navigating, while the visual representation of the root socket node is selected, to a visual representation that corresponds to one of the plurality of distinct mesh socket nodes displayed on the mesh configuration UI, and (iii) releasing the mouse cursor over the visual representation that corresponds to the one of the plurality of distinct mesh socket nodes.

It shall be recognized that, in such an embodiment, the release of the mouse cursor over the visual representation that corresponds to the one of the plurality of distinct mesh socket nodes designates the one of the plurality of distinct mesh socket nodes as an ingress socket node. It shall be further recognized that, in such an embodiment, the respective graphical socket transition may be created between the egress socket node and the ingress socket node in response to the sequence of inputs being performed during the interactive gesture-based tracking state (e.g., the same sequence of inputs would not cause a creation of the respective graphical socket if the mesh configuration UI was not in the interactive gesture-based tracking state). It shall be recognized that a graphical socket transition may be created between any two mesh socket nodes in analogous ways.

Figure 11:
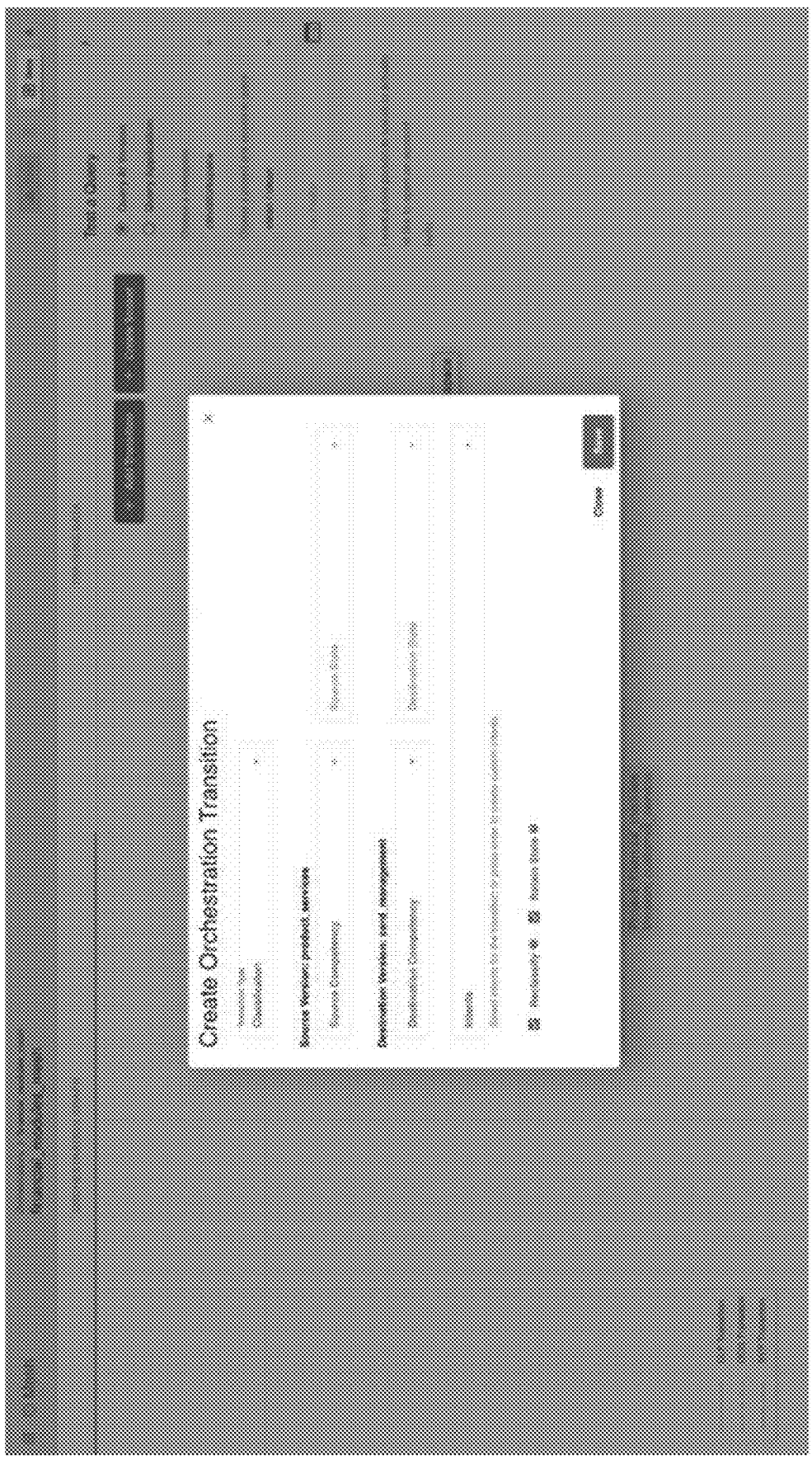

Additionally, in such an embodiment, the root socket node may comprise an operational proxy to the first disparate AI dialogue model that includes a plurality of distinct dialogue state nodes associated with a first dialogue competency and the one of the plurality of distinct mesh socket nodes may comprise the operational proxy to a second disparate AI dialogue model of the plurality of disparate AI dialogue models that includes a plurality of distinct dialogue state nodes associated with a second dialogue competency. In one or more embodiments, the system or service implementing method 200 may function to automatically instantiate, in real-time by the one or more computer processors, a socket transition popover in response to detecting the release of the mouse cursor over the visual representation that corresponds to the one of the plurality of distinct mesh socket nodes, as shown generally by way of example in FIG. 11. In other words, in some embodiments, in response to detecting the release of the mouse cursor over the visual representation of the mesh socket node, the system or service implementing method 200 may render a socket transition popover as an interactive UI element that enables the user to define transition conditions for linking the selected mesh socket node to the root socket node, thereby facilitating real-time orchestration of dialogue flow between disparate AI dialogue models.

The socket transition popover, in one or more embodiments, may include one or more of a transition type UI element that, when selected, displays a dropdown menu element of a plurality of distinct socket transition types available to the user, an egress dialogue state UI element that, when selected, displays a dropdown menu element of the plurality of distinct dialogue state nodes corresponding to the first disparate AI dialogue model, and an ingress dialogue state UI element that, when selected, displays a dropdown menu element of the plurality of distinct dialogue state nodes corresponding to the second disparate AI dialogue model. Accordingly, in one or more embodiments, while displaying the socket transition popover, the system or service implementing method 200 may receive, at the socket transition UI element, a user input selecting a target socket transition type from the dropdown menu element of the plurality of distinct socket transition types, receive, at the egress dialogue state UI element, a user input selecting a target dialogue state node included in the dropdown menu element of the plurality of distinct dialogue state nodes corresponding to the first disparate AI dialogue model, and receive, at the ingress dialogue state UI element, a user input selecting a subject dialogue state node included in the dropdown menu element of the plurality of distinct dialogue state nodes corresponding to the second disparate AI dialogue model. It shall be recognized that, in such an embodiment, the respective graphical socket transition described above may be encoded or created based on the target socket transition type selected at the socket transition UI element, the target dialogue state node selected at the egress dialogue state UI element, and the subject dialogue state node selected at the ingress dialogue state UI element.

Additionally, or alternatively, in one or more embodiments, the socket transition popover may further include one or more checkbox user interface elements. For instance, in a non-limiting example, the socket transition popover may include a reclassify checkbox UI element that, when selected by the user, configures (or encodes) the model orchestration mesh to perform a reclassification operation on the input utterance upon reaching the destination state (e.g., the dialogue state node specified by the ingress dialogue state UI element, the ingress socket node, etc.). Additionally, or alternatively, in some embodiments, the socket transition popover may include a retain state checkbox UI element that, when selected by the user, configures the model orchestration mesh to preserve or carry forward the current dialogue state associated with the source version (e.g., egress socket node, the dialogue state node specified by the egress dialogue state UI element, etc.), such that the contextual state from the egress dialogue state node or the source socket node is maintained across the socket transition into the destination state. In such embodiments, the system may receive user input interacting with one or more of the checkbox UI elements and encode the corresponding socket transition configuration within the model orchestration mesh based on the user's selections. The resulting socket transition definition may then include metadata or behavioral flags indicating whether reclassification and/or state retention operations are to be executed at runtime during traversal of the defined socket transition. It shall be recognized that, in some embodiments, the reclassify checkbox UI element and the retain state checkbox UI element may be enabled (e.g., selected) by default.

Stated another way, in one or more embodiments, the reclassify and retain state checkbox UI elements may enable the user to declaratively configure whether the system should invoke a reclassification operation and/or preserve the source dialogue state during an execution of the respective socket transition. In other words, when a user selects the reclassify checkbox UI element, the user is forcing the AI version, model orchestration mesh, and/or a disparate AI dialogue model to reclassify or process the query again (e.g., the reclassify checkbox UI element, when selected, will cause a respective natural language input to be classified again using the machine learning-based classifier located at the transition's destination state or socket. Furthermore, when a user selects the retain state checkbox UI element, the user is forcing the model orchestration mesh to keep the context of the entire conversation by keeping the slot values throughout each socket transition.

Additionally, or alternatively, in one or more embodiments, in response to creating the model orchestration mesh, the system or service implementing method 200 may enable, by the one or more computer processors, a runtime deployment of the model orchestration mesh in a production environment to control the virtual dialogue agent that uses the plurality of disparate AI dialogue models. In one or more embodiments, in response to the virtual dialogue agent receiving one or more natural language inputs from an entity, the model orchestration mesh may be executed and/or used to selectively invoke one or more of the plurality of disparate AI dialogue models during a multi-turn conversation with the entity to respond to the one or more natural language inputs.

For instance, in a non-limiting example, the one or more natural language inputs received by the virtual dialogue agent may correspond to a plurality of distinct dialogue competencies. In such a non-limiting example, each disparate AI dialogue model of the plurality of disparate AI dialogue models may be configured to handle a distinct dialogue competency of the plurality of distinct dialogue competencies. Furthermore, in such a non-limiting example, each disparate AI dialogue model of the plurality of disparate AI dialogue models may include a respective automated dialogue control system structure comprising a respective set of dialogue state nodes and a respective set of dialogue state transitions for handling user queries related to the distinct dialogue competency. Accordingly, in such a non-limiting example, the model orchestration mesh created using the mesh configuration UI may combine the plurality of disparate AI dialogue models into a single composite AI dialogue model that enables the virtual dialogue agent to handle the multi-turn conversation spanning across multiple distinct dialogue competencies.

Stated another way, in one or more embodiments, the first disparate AI dialogue model associated with the root socket node of the model orchestration mesh may only be configured to handle natural language input provided to the virtual dialogue agent that corresponds to a first distinct dialogue competency. Additionally, in such an embodiment, a first distinct mesh socket node of the model orchestration mesh may include an operational proxy to a second disparate AI dialogue model of the plurality of disparate AI dialogue models, wherein the second disparate AI dialogue model is configured to only handle natural language input provided to the virtual dialogue agent that corresponds to a second distinct dialogue competency. Furthermore, in such an embodiment, a second distinct mesh socket node of the model orchestration mesh may include an operational proxy to a third disparate AI dialogue model of the plurality of disparate AI dialogue models, wherein the third disparate AI dialogue model is configured to only handle natural language inputs provided to the virtual dialogue agent that corresponds to a third distinct dialogue competency.

In a non-limiting example, a first natural language input of the one or more natural language inputs received by the virtual dialogue agent corresponds to the third distinct dialogue competency and, in turn, the model orchestration mesh automatically routes the first natural language input that corresponds to the third distinct dialogue competency to the second distinct mesh socket node as the third disparate AI dialogue model is operably configured to handle the third distinct dialogue competency. Furthermore, in such a non-limiting example, the model orchestration mesh invokes the third disparate AI dialogue model to generate a response to the first natural language input in response to routing the first natural language input to the third disparate AI dialogue model and does not route the first natural language input that corresponds to the third distinct dialogue competency to the first distinct mesh socket node as the second disparate AI dialogue model is not operably configured to handle the third distinct dialogue competency. In other words, the model orchestration mesh does not invoke the second disparate AI dialogue model to respond to the first natural language input.

In another non-limiting example, a second natural language input of the one or more natural language inputs received by the virtual dialogue agent corresponds to the second distinct dialogue competency and, in turn, the virtual dialogue agent invokes the second disparate AI dialogue model to respond to the second natural language input as the second disparate AI dialogue model is operably configured to handle the second distinct dialogue competency. It shall be recognized that, in such a non-limiting example, the virtual dialogue agent does not invoke the third disparate AI dialogue model to respond to the second natural language input as the third disparate AI dialogue model is not operably configured to handle the second distinct dialogue competency.

3. Computer-Implemented Method and Computer Program Product

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein. Furthermore, each method step, process step, or the like described herein may be performed in real-time or near real-time.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for controlling a virtual dialogue agent that uses a plurality of disparate artificial intelligence (AI) dialogue models, the computer-implemented method comprising:

instantiating, by one or more computer processors, a mesh configuration user interface (UI) that provides a user with a graphical environment for creating a model orchestration mesh controlling an operation of the plurality of disparate AI dialogue models associated with the virtual dialogue agent;

in response to instantiating the mesh configuration UI, automatically installing, within the graphical environment of the mesh configuration UI, a root socket node that functions as an entry point for input data into the model orchestration mesh;

digitally assigning, by the one or more computer processors, a first disparate AI dialogue model of the plurality of disparate AI dialogue models to the root socket node in response to receiving, via the mesh configuration UI, a request from the user to digitally pair the first disparate AI dialogue model to the root socket node;

automatically generating in real-time, within the graphical environment of the mesh configuration UI, a plurality of distinct mesh socket nodes based on receiving a plurality of user inputs operating a mesh socket creation button displayed on the mesh configuration UI, wherein:

each distinct mesh socket node of the plurality of distinct mesh socket nodes comprises an operational proxy of a distinct one of the plurality of disparate AI dialogue models;

receiving, via the mesh configuration UI, an input from the user selecting a graphical UI control element displayed on the mesh configuration UI that, when selected, changes a state of the mesh configuration UI to an interactive gesture-based tracking state;

while the mesh configuration UI is in the interactive gesture-based tracking state:

constructing, within the graphical environment of the mesh configuration UI, a plurality of graphical socket transitions that (i) connect the root socket node to at least a subset of the plurality of distinct mesh socket nodes and (ii) connect target pairs of mesh socket nodes of the plurality of distinct mesh socket nodes together, thereby enabling dialogue data packets to be transferred between the root socket node and the plurality of distinct mesh socket nodes as enforced by the plurality of graphical socket transitions; and enabling, by the one or more computer processors, a runtime deployment of the model orchestration mesh in a production environment to control the virtual dialogue agent that uses the plurality of disparate AI dialogue models based at least on the creation of the model orchestration mesh.

2. The computer-implemented method according to claim 1, wherein:

the interactive gesture-based tracking state enables the user to construct a respective graphical socket transition of the plurality of graphical socket transitions by performing a continuous sequence of inputs comprising:

(i) selecting, using a mouse cursor, a visual representation of the root socket node displayed on the mesh configuration UI, wherein selecting the visual representation of the root socket node designates the root socket node as an egress socket node, (ii) navigating, while the visual representation of the root socket node is selected, to a visual representation that corresponds to one of the plurality of distinct mesh socket nodes displayed on the mesh configuration UI, and (iii) releasing the mouse cursor over the visual representation that corresponds to the one of the plurality of distinct mesh socket nodes, wherein:

the release of the mouse cursor over the visual representation that corresponds to the one of the plurality of distinct mesh socket nodes designates the one of the plurality of distinct mesh socket nodes as an ingress socket node, and the respective graphical socket transition is created between the egress socket node and the ingress socket node in response to the continuous sequence of inputs being performed during the interactive gesture-based tracking state.

3. The computer-implemented method according to claim 2, wherein:

the root socket node comprises an operational proxy to the first disparate AI dialogue model, wherein the first disparate AI dialogue model includes a plurality of distinct dialogue state nodes associated with a first dialogue competency, the one of the plurality of distinct mesh socket nodes comprises the operational proxy to a second disparate AI dialogue model of the plurality of disparate AI dialogue models, wherein the second disparate AI dialogue model includes a plurality of distinct dialogue state nodes associated with a second dialogue competency, the computer-implemented method further includes:

automatically instantiating, by the one or more computer processors, a socket transition popover in response to detecting the release of the mouse cursor over the visual representation that corresponds to the one of the plurality of distinct mesh socket nodes, wherein the socket transition popover includes:

a socket transition type UI element that, when selected, displays a dropdown menu element of a plurality of distinct socket transition types available to the user, an egress dialogue state UI element that, when selected, displays a dropdown menu element of the plurality of distinct dialogue state nodes corresponding to the first disparate AI dialogue model, and an ingress dialogue state UI element that, when selected, displays a dropdown menu element of the plurality of distinct dialogue state nodes corresponding to the second disparate AI dialogue model.

4. The computer-implemented method according to claim 3, further comprising:

while displaying the socket transition popover:

receiving, at the socket transition type UI element, a user input selecting a target socket transition type from the dropdown menu element of the plurality of distinct socket transition types, receiving, at the egress dialogue state UI element, a user input selecting a target dialogue state node included in the dropdown menu element of the plurality of distinct dialogue state nodes corresponding to the first disparate AI dialogue model, receiving, at the ingress dialogue state UI element, a user input selecting a subject dialogue state node included in the dropdown menu element of the plurality of distinct dialogue state nodes corresponding to the second disparate AI dialogue model, wherein the respective graphical socket transition is further created or encoded based on (i) the target socket transition type selected at the socket transition type UI element, (ii) the target dialogue state node selected at the egress dialogue state UI element, and (iii) the subject dialogue state node selected at the ingress dialogue state UI element.

5. The computer-implemented method according to claim 1, further comprising:

receiving, from the user, an input selecting the root socket node displayed within the graphical environment of the mesh configuration UI, instantiating, by the one or more computer processors, an AI assignment popover overlaid on the mesh configuration UI in response to receiving the input selecting the root socket node, wherein the AI assignment popover includes:

an AI model UI element that, when selected, displays a dropdown menu element of the plurality of disparate AI dialogue models;

displaying, within the AI assignment popover, the dropdown menu element of the plurality of disparate AI dialogue models in response to receiving an input from the user selecting the AI model UI element; and receiving, while displaying the dropdown menu element of the plurality of disparate AI dialogue models, a selection of a menu item included in the dropdown menu element of the plurality of disparate AI dialogue models that corresponds to the first disparate AI dialogue model, wherein:

the first disparate AI dialogue model is digitally assigned to the root socket node in response to receiving the selection of the menu item included in the dropdown menu element of the plurality of disparate AI dialogue models that corresponds to the first disparate AI dialogue model.

6. The computer-implemented method according to claim 1, wherein:
automatically generating the plurality of distinct mesh socket nodes within the graphical environment of the mesh configuration UI includes generating:
a first distinct mesh socket node that comprises the operational proxy to a second disparate AI dialogue model of the plurality of disparate AI dialogue models, and
a second distinct mesh socket node that comprises the operational proxy to a third disparate AI dialogue model of the plurality of disparate AI dialogue models.

7. The computer-implemented method according to claim 6, further comprising:
in response to receiving a first user input of the plurality of user inputs that operates the mesh socket creation button displayed on the mesh configuration UI, instantiating, by the one or more computer processors, a socket AI assignment popover overlaid on the mesh configuration UI, wherein the socket AI assignment popover includes:
an AI model UI element that, when selected, displays a dropdown menu element of the plurality of disparate AI dialogue models;
displaying, within the socket AI assignment popover, the dropdown menu element of the plurality of disparate AI dialogue models in response to receiving an input from the user selecting the AI model UI element;
receiving, while displaying the dropdown menu element of the plurality of disparate AI dialogue models, a selection of a menu item included in the dropdown menu element of the plurality of disparate AI dialogue models that corresponds to the second disparate AI dialogue model, wherein:
the first distinct mesh socket node is automatically generated within the graphical environment of the mesh configuration UI in response to receiving an input from the user selecting a socket generation button displayed on the socket AI assignment popover while the menu item corresponding to the second disparate AI dialogue model is selected.

8. The computer-implemented method according to claim 7, further comprising:
in response to receiving a second user input of the plurality of user inputs that operates the mesh socket creation button displayed on the mesh configuration UI, instantiating, by the one or more computer processors, the socket AI assignment popover overlaid on the mesh configuration UI;
displaying, within the socket AI assignment popover, the dropdown menu element of the plurality of disparate AI dialogue models in response to receiving a subsequent input from the user selecting the AI model UI element;
receiving, while displaying the dropdown menu element of the plurality of disparate AI dialogue models, a selection of a menu item included in the dropdown menu element of the plurality of disparate AI dialogue models that corresponds to the third disparate AI dialogue model, wherein:
the second distinct mesh socket node is automatically generated within the graphical environment of the mesh configuration UI in response to receiving a further subsequent input from the user selecting the socket generation button displayed on the socket AI assignment popover while the menu item corresponding to the third disparate AI dialogue model is selected.

9. The computer-implemented method according to claim 1, further comprising:
in response to the virtual dialogue agent receiving one or more natural language inputs from an entity, the model orchestration mesh is executed to selectively invoke one or more of the plurality of disparate AI dialogue models during a multi-turn conversation with the entity to respond to the one or more natural language inputs.

10. The computer-implemented method according to claim 9, wherein:
the one or more natural language inputs received by the virtual dialogue agent correspond to a plurality of distinct dialogue competencies,
each disparate AI dialogue model of the plurality of disparate AI dialogue models is configured to handle a distinct dialogue competency of the plurality of distinct dialogue competencies,
each disparate AI dialogue model of the plurality of disparate AI dialogue models includes a respective automated dialogue control system structure comprising a respective set of dialogue state nodes and a respective set of dialogue state transitions for handling user queries related to the distinct dialogue competency; and
the model orchestration mesh created using the mesh configuration UI combines the plurality of disparate AI dialogue models into a single composite AI dialogue model that enables the virtual dialogue agent to handle the multi-turn conversation spanning across multiple distinct dialogue competencies.

11. A computer-implemented system for controlling a virtual dialogue agent that uses a plurality of disparate artificial intelligence (AI) dialogue models, the computer-implemented system comprising:
one or more computer processors;
a memory;
a computer-readable medium operably coupled to the one or more computer processors, the computer-readable medium having computer-readable instructions stored thereon that, when executed by the one or more computer processors, cause a computing device to perform operations comprising:
instantiating, by the one or more computer processors, a mesh configuration user interface (UI) that provides a user with a graphical environment for creating a model orchestration mesh controlling an operation of the plurality of disparate AI dialogue models associated with the virtual dialogue agent;
in response to instantiating the mesh configuration UI, automatically installing, within the graphical environment of the mesh configuration UI, a root socket node that functions as an entry point for input data into the model orchestration mesh;
digitally assigning, by the one or more computer processors, a first disparate AI dialogue model of the plurality of disparate AI dialogue models to the root socket node in response to receiving, via the mesh configuration UI, a request from the user to digitally pair the first disparate AI dialogue model to the root socket node;

automatically generating in real-time, within the graphical environment of the mesh configuration UI, a plurality of distinct mesh socket nodes based on receiving a plurality of user inputs operating a mesh socket creation button displayed on the mesh configuration UI, wherein:

each distinct mesh socket node of the plurality of distinct mesh socket nodes comprises an operational proxy to a distinct one of the plurality of disparate AI dialogue models;

receiving, via the mesh configuration UI, an input from the user selecting a graphical UI control element displayed on the mesh configuration UI that, when selected, changes a state of the mesh configuration UI to an interactive gesture-based tracking state;

while the mesh configuration UI is in the interactive gesture-based tracking state:

constructing, within the graphical environment of the mesh configuration UI, a plurality of graphical socket transitions that (i) connect the root socket node to at least a subset of the plurality of distinct mesh socket nodes and (ii) connect target pairs of mesh socket nodes of the plurality of distinct mesh socket nodes together, thereby enabling dialogue data packets to be transferred between the root socket node and the plurality of distinct mesh socket nodes as enforced by the plurality of graphical socket transitions; and enabling, by the one or more computer processors, a runtime deployment of the model orchestration mesh in a production environment to control the virtual dialogue agent that uses the plurality of disparate AI dialogue models based at least on the creation of the model orchestration mesh, wherein:

in response to the virtual dialogue agent receiving one or more natural language inputs from an entity, the model orchestration mesh is executed to selectively invoke one or more of the plurality of disparate AI dialogue models during a multi-turn conversation with the entity to respond to the one or more natural language inputs.

12. The computer-implemented system according to claim 11, wherein:

the first disparate AI dialogue model of the plurality of disparate AI dialogue models is configured to handle any natural language input provided to the virtual dialogue agent that corresponds to a first distinct dialogue competency, automatically generating the plurality of distinct mesh socket nodes within the graphical environment of the mesh configuration UI includes:

generating a first distinct mesh socket node that comprises the operational proxy to a second disparate AI dialogue model of the plurality of disparate AI dialogue models, wherein the second disparate AI dialogue model is configured to handle any natural language input provided to the virtual dialogue agent that corresponds to a second distinct dialogue competency, and generating a second distinct mesh socket node that comprises the operational proxy to a third disparate AI dialogue model of the plurality of disparate AI dialogue models, wherein the third disparate AI dialogue model is configured to handle any natural language input provided to the virtual dialogue agent that corresponds to a third distinct dialogue competency.

13. The computer-implemented system according to claim 12, wherein:

a first natural language input of the one or more natural language inputs received by the virtual dialogue agent corresponds to the third distinct dialogue competency, the model orchestration mesh automatically routes the first natural language input that corresponds to the third distinct dialogue competency to the second distinct mesh socket node as the third disparate AI dialogue model is operably configured to handle the third distinct dialogue competency, the model orchestration mesh invokes the third disparate AI dialogue model to generate a response to the first natural language input in response to routing the first natural language input to the third disparate AI dialogue model, the model orchestration mesh does not route the first natural language input that corresponds to the third distinct dialogue competency to the first distinct mesh socket node as the second disparate AI dialogue model is not operably configured to handle the third distinct dialogue competency, and the model orchestration mesh does not invoke the second disparate AI dialogue model to respond to the first natural language input.

14. The computer-implemented system according to claim 12, wherein:

a second natural language input of the one or more natural language inputs received by the virtual dialogue agent corresponds to the second distinct dialogue competency, the virtual dialogue agent invokes the second disparate AI dialogue model to respond to the second natural language input as the second disparate AI dialogue model is operably configured to handle the second distinct dialogue competency, and the virtual dialogue agent does not invoke the third disparate AI dialogue model to respond to the second natural language input as the third disparate AI dialogue model is not operably configured to handle the second distinct dialogue competency.

15. The computer-implemented system according to claim 1, wherein:

a first mesh socket node of the plurality of distinct mesh socket nodes comprises the operational proxy to a second disparate AI dialogue model of the plurality of disparate AI dialogue models and includes a socket-level memory store, the socket-level memory store is configured to store one or more dialogue slots generated or extracted by the second disparate AI dialogue model in response to the one or more natural language inputs, a second mesh socket node of the plurality of distinct mesh socket nodes comprises the operational proxy to a third disparate AI dialogue model of the plurality of disparate AI dialogue models and is configured to read the one or more dialogue slots stored in the socket-level memory store of the first mesh socket node, and the computer-readable instructions, when executed by the one or more computer processors, cause the computing device to perform further operations comprising:

providing the one or more dialogue slots read from the socket-level memory store of the first mesh socket node to the third disparate AI dialogue model during a subject socket transition between the first mesh socket node and the second mesh socket node, and generating a natural language response to the one or more natural language inputs based on the third disparate AI dialogue model assessing the one or more natural language inputs in combination with the one or more dialogue slots.

16. The computer-implemented system according to claim 14, wherein the computer-readable instructions, when executed by the one or more computer processors, cause the computing device to perform further operations comprising:

training, by the one or more computer processors, a machine learning-based mesh classification model using a plurality of labeled utterances, wherein:

each labeled utterance of the plurality of labeled utterances corresponds to a dialogue intent associated with a subject graphical socket transition within the model orchestration mesh, and the machine learning-based mesh classification model is executed to compute an intent classification prediction that corresponds to a respective natural language input of the one or more natural language inputs received by the virtual dialogue agent, and the model orchestration mesh executes a respective graphical socket transition of the plurality of graphical socket transitions that matches the intent classification prediction associated with the respective natural language input.

17. A computer-program product comprising in a non-transitory machine-readable storage medium storing computer instructions that, when executed by one or more computer processors, perform operations comprising:

instantiating, by the one or more computer processors, a mesh configuration user interface (UI) that provides a user with a graphical environment for creating a model orchestration mesh that controls an operation of a virtual dialogue agent and a plurality of disparate AI dialogue models associated with the virtual dialogue agent;

in response to instantiating the mesh configuration UI, automatically installing, within the graphical environment of the mesh configuration UI, a root socket node that functions as an entry point for input data into the model orchestration mesh;

digitally assigning, by the one or more computer processors, a first disparate AI dialogue model of the plurality of disparate AI dialogue models to the root socket node in response to receiving, via the mesh configuration UI, a request from the user to digitally pair the first disparate AI dialogue model with the root socket node;

automatically generating in real-time, within the graphical environment of the mesh configuration UI, a plurality of distinct mesh socket nodes based on receiving a plurality of user inputs selecting a mesh socket creation button displayed on the mesh configuration UI, wherein:

each distinct mesh socket node of the plurality of distinct mesh socket nodes is coupled to a distinct one of the plurality of disparate AI dialogue models;

constructing, within the graphical environment of the mesh configuration UI, a plurality of graphical socket transitions that (i) connect the root socket node to at least a subset of the plurality of distinct mesh socket nodes and (ii) connect target pairs of mesh socket nodes of the plurality of distinct mesh socket nodes together, thereby enabling the virtual dialogue agent to operate across the plurality of disparate AI dialogue models via the model orchestration mesh; and deploying, via the one or more computer processors, the model orchestration mesh into a production environment to control the virtual dialogue agent, wherein:

in response to the virtual dialogue agent receiving one or more natural language inputs from an entity, the model orchestration mesh is executed to selectively invoke one or more of the plurality of disparate AI dialogue models during a multi-turn conversation with the entity to respond to the one or more natural language inputs.

18. The computer-program product according to claim 17, wherein:

automatically generating the plurality of distinct mesh socket nodes within the graphical environment of the mesh configuration UI includes generating:

a first distinct mesh socket node that functions as a proxy to a second disparate AI dialogue model of the plurality of disparate AI dialogue models, and a second distinct mesh socket node that functions as a proxy to a third disparate AI dialogue model of the plurality of disparate AI dialogue models.

19. The computer-program product according to claim 18, wherein:

constructing, within the graphical environment of the mesh configuration UI, the plurality of graphical socket transitions includes constructing a first graphical socket transition, wherein constructing the first graphical socket transition includes:

receiving, via the mesh configuration UI, an input from the user selecting an add socket transition button displayed on the mesh configuration UI;

transitioning, in response to receiving the input selecting the add socket transition button, the mesh configuration UI into a socket transition creation mode that allows the user to construct the first graphical socket transition via a drag-and-drop operation;

detecting, by the one or more computer processors, the drag-and-drop operation that connects the root socket node to the first distinct mesh socket node; and instantiating, by the one or more computer processors, a create orchestration transition popover overlaid on the mesh configuration UI in response to detecting the drag-and-drop operation, wherein the create orchestration transition popover includes:

a socket transition type UI element that, when selected, displays a dropdown menu element of a plurality of distinct socket transition types available to the user, a source state UI element that, when selected, displays a dropdown menu element of a first plurality of distinct dialogue states nodes included in the first disparate AI dialogue model associated with the root socket node, a destination state UI element that, when selected, displays a dropdown menu element of a second plurality of distinct dialogue states nodes included in the second disparate AI dialogue model associated with the first distinct mesh socket node;

receiving, at the socket transition type UI element, a user input selecting a target socket transition type from the dropdown menu element of the plurality of distinct socket transition types, receiving, at the source state UI element, a user input selecting a target dialogue state node included in the dropdown menu element of the first plurality of distinct dialogue states nodes, and receiving, at the destination state UI element, a user input selecting a subject dialogue state node included in the dropdown menu element of the second plurality of distinct dialogue states nodes, wherein the first graphical socket transition is created between the root socket node and the first distinct mesh socket node based on (i) the target socket transition type selected at the socket transition type UI element, (ii) the target dialogue state node selected at the source state UI element, and (iii) the subject dialogue state node selected at the destination state UI element.

20. The computer-program product according to claim 18, wherein:

constructing, within the graphical environment of the mesh configuration UI, the plurality of graphical socket transitions includes constructing a second graphical socket transition, wherein constructing the second graphical socket transition includes:

receiving, via the mesh configuration UI, an input from the user selecting an add socket transition button displayed on the mesh configuration UI;

transitioning, in response to receiving the input selecting the add socket transition button, the mesh configuration UI into a socket transition creation mode that allows the user to construct the second graphical socket transition via a drag-and-drop operation;

detecting, by the one or more computer processors, the drag-and-drop operation that starts at the first distinct mesh socket node and ends at the second distinct mesh socket node; and instantiating, by the one or more computer processors, a create orchestration transition popover overlaid on the mesh configuration UI in response to detecting the drag-and-drop operation, wherein the create orchestration transition popover includes:

a socket transition type UI element that, when selected, displays a dropdown menu element of a plurality of distinct socket transition types available to the user, a source state UI element that, when selected, displays a dropdown menu element of a first plurality of distinct dialogue states nodes included in the second disparate AI dialogue model associated with the first distinct mesh socket node, a destination state UI element that, when selected, displays a dropdown menu element of a second plurality of distinct dialogue states nodes included in the third disparate AI dialogue model associated with the second distinct mesh socket node, receiving, at the socket transition type UI element, a user input selecting a target socket transition type from the dropdown menu element of the plurality of distinct socket transition types, receiving, at the source state UI element, a user input selecting a target dialogue state node included in the dropdown menu element of the first plurality of distinct dialogue states nodes, and receiving, at the destination state UI element, a user input selecting a subject dialogue state node included in the dropdown menu element of the second plurality of distinct dialogue states nodes, wherein the second graphical socket transition is created between the first distinct mesh socket node and the second distinct mesh socket node based on (i) the target socket transition type selected at the socket transition type UI element, (ii) the target dialogue state node selected at the source state UI element, and (iii) the subject dialogue state node selected at the destination state UI element.

* * * * *